US005158221A

United States Patent [19]

Hashimoto et al.

[11] Patent Number: 5,158,221

[45] Date of Patent: Oct. 27, 1992

[54] AUTOMATIC DOCUMENT FEEDER CAPABLE OF FEEDING A DOCUMENT IN THE FORM OF A COMPUTER FORM

[75] Inventors: Kenji Hashimoto, Tokyo; Shirou Saeki, Yokohama; Yukitaka Nakazato, Tokyo; Tadashi Ikoma, Yokohama, all of Japan

[73] Assignee: Ricoh Company, Ltd., Tokyo, Japan

[21] Appl. No.: 575,865

[22] Filed: Aug. 31, 1990

[30] Foreign Application Priority Data

| | | | |
|---|---|---|---|
| May 24, 1988 | [JP] | Japan | 63-126494 |
| Jun. 25, 1988 | [JP] | Japan | 63-83438[U] |
| Jul. 6, 1988 | [JP] | Japan | 63-89070[U] |
| Sep. 4, 1989 | [JP] | Japan | 1-227317 |
| Sep. 4, 1989 | [JP] | Japan | 1-227318 |
| May 30, 1990 | [JP] | Japan | 2-138312 |

[51] Int. Cl.[5] ........ B65H 23/00; G03B 15/10

[52] U.S. Cl. ........ 226/110; 226/24; 400/581; 355/207; 355/311; 355/316

[58] Field of Search ........ 226/110, 24, 27; 400/708, 708.1, 711, 581, 237 E; 355/203, 204, 207, 208, 308, 311, 316

[56] References Cited

U.S. PATENT DOCUMENTS

| | | | |
|---|---|---|---|
| 3,865,481 | 2/1975 | Washio et al. | 355/310 |
| 3,865,482 | 2/1975 | Bendall et al. | 355/308 |
| 4,219,191 | 8/1980 | Rastorguyeff | 271/171 X |
| 4,320,960 | 3/1982 | Ward et al. | 355/14 R |
| 4,469,436 | 9/1989 | Jones et al. | 271/3.1 X |
| 4,485,949 | 12/1984 | Gebhart et al. | 226/2 |
| 4,526,309 | 7/1985 | Taylor et al. | 226/33 |
| 4,778,296 | 10/1988 | Takahashi | 400/711 X |
| 4,786,039 | 11/1988 | Ito | 271/3.1 |
| 4,815,722 | 3/1989 | Sugimoto | 271/171 X |
| 4,843,437 | 6/1989 | Hamano | 355/308 X |
| 4,869,488 | 9/1989 | Hirota et al. | 271/3.1 |
| 4,881,840 | 11/1989 | Rendon et al. | 400/711 X |
| 4,937,622 | 6/1990 | Makiura | 355/316 X |
| 4,957,285 | 9/1990 | Yamada | 271/3.1 |
| 4,985,729 | 1/1991 | Sampath et al. | 355/308 X |

FOREIGN PATENT DOCUMENTS

| | | | |
|---|---|---|---|
| 2912656 | 10/1956 | Fed. Rep. of Germany | 900/708 |
| 191935 | 9/1985 | Japan | 271/3 |
| 92144 | 4/1989 | Japan | 271/3 |
| 1430047 | 3/1976 | United Kingdom . | |
| 2188618 | 10/1987 | United Kingdom . | |

*Primary Examiner*—Daniel P. Stodola
*Assistant Examiner*—P. Bowen
*Attorney, Agent, or Firm*—Oblon, Spivak, McClelland, Maier & Neustadt

[57] ABSTRACT

An automatic document feeder (ADF) for use with an electrophotographic copier, digital copier or similar image recorder for selectively feeding ordinary documents in the form of separate sheets and a continuous document in the form of computer form (CF) paper. Sprocket holes formed through the CF paper are sensed to controllably transport and stop the CF paper on the basis of the number of sensed holes. Slippage of the CF paper apt to occur when the paper begins to be transported and when it is transported by a belt that faces a glass platen is prevented from being erroneously determined to be a jam. Cuts intervening between nearby sprocket holes for temporarily fastening a carbon to the CF paper are prevented from being sensed as the sprocket holes.

4 Claims, 39 Drawing Sheets

22
20

22
20A 14c
16c
12b
14b
16b
12a
14a
L1
24
10
16a 14c
16c
12b
14b
16b
X1
12a
14a
24
10A
16a

AUTOMATIC DOCUMENT FEEDER CAPABLE OF FEEDING A DOCUMENT IN THE FORM OF A COMPUTER FORM

CROSS REFERENCE TO RELATED APPLICATION

This application is a continuation-in-part of copending U.S. Application Ser. No. 07/356,452, filed May 24, 1989, now abandoned.

BACKGROUND OF THE INVENTION

The present invention relates to an automatic document feeder (ADF) for use with an electrophotographic copier, digital copier or similar image recorder for selectively feeding ordinary documents in the form of separate sheets and a continuous document in the form of computer form (CF) paper.

An ADF is extensively used with the above-described kind of image recorder for automatically feeding a document to a glass platen of the image recorder while preventing it from jamming the path or from being damaged, then stopping it on the glass plate, and then discharging it after an image printed thereon has been scanned. Documents usable with the ADF include ordinary documents in the form of separate sheets and elongate documents such as CF paper. Generally, CF paper has a number of sprocket holes formed through a marginal area thereof. Specifically, the sprocket holes are positoned one after another in an intended direction of paper feed to mesh with the teeth of a sprocket which drives the CF paper. A sensor is located on the transport path of the CF paper to sense the sprocket holes, so that the transport of the paper may be controlled in response to the output of the sensor. An ADF having a capability for transporting such CF paper to the glass platen is disclosed in Japanese Patent Laid-open Publication No. 72455/1984. A drawback with a prior art ADF having such a capability is that the document transport control cannot be readily implemented for each of different kinds of documents. Moreover, it is difficult to accurately position a document in a predetermined position of a glass platen for imagewise exposure. Especially, sequentially locating consecutive pages provided on CF paper in the particular position on the platen is extremely difficult.

CF paper with a carbon is a special kind of CF paper and has, in addition to ordinary sprocket holes, some cuts intervening between nearby sprocket holes. Such cuts are adapted to fasten the CF paper and carbon temporarily to each other. An ADF capable of transporting CF paper with a carbon to the glass platen is taught in Japanese Patent Laid-Open Publication No. 72456/1984 by way of example. The ADF disclosed in this Laid-Open Publication adopts an extremely complicated system for discriminating the above-mentioned cuts from the sprocket holes. Specifically, the system is such that the number of sprocket holes are divided into consecutive zones and sensed by a sensor zone by zone. Nevertheless, this prior art ADF is not entirely free from the fear that the cuts intervening between nearby sprocket holes are erroneously determined to be the sprocket holes.

SUMMARY OF THE INVENTION

It is therefore an object of the present invention to eliminate the drawbacks particular to the prior art ADF having a CF paper and CF paper with a carbon transporting capability as discussed above.

It is another object of the present invention to provide an ADF for an image recorder capable of feeding an ordinary document, CF paper and CF paper with a carbon to a glass platen without any jam or damage to the paper, and allowing each page of CF paper with or without a carbon to be reproduced with accuracy.

It is another object of the present invention to provide an ADF for an image recorder which allows the first page of CF paper with or without a carbon to be positioned on a glass platen by hand and, yet, surely transports and stops it page by page to the last page.

It is another object of the present invention to provide an ADF for an image recorder capable of surely feeding CF paper with a carbon to a glass platen while positively discriminating fastening cuts thereof from sprocket holes.

It is another object of the present invention to provide a generally improved ADF for an image recorder.

An ADF for an image recorder having a top open platen of the present invention comprises a sheet-like document feeding member for feeding sheet-like documents to the platen, each of the sheet-like documents having a predetermined size, a separate inlet for feeding therethrough to the platen a continuous document consistuted by a sequence of continuous pages and having a plurality of equally spaced holes, a document transporting member located to face the platen for transporting any of the documents placed on and along the platen, a document discharging member for discharging the document from the platen, a holes sensor located upstream of the platen with respect to an intended direction of transport of the continuous document for generating feed pulses by sensing the feed holes of the continuous documents, a counter for counting the generated feed pulses, and a controller for controlling the counter such that, when the counter counts a predetermined number of feed pulses, the continuous document is determined to have jammed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, a prior art ADF will be outlined.

Figures 1A, 1B, 1C, 1D:
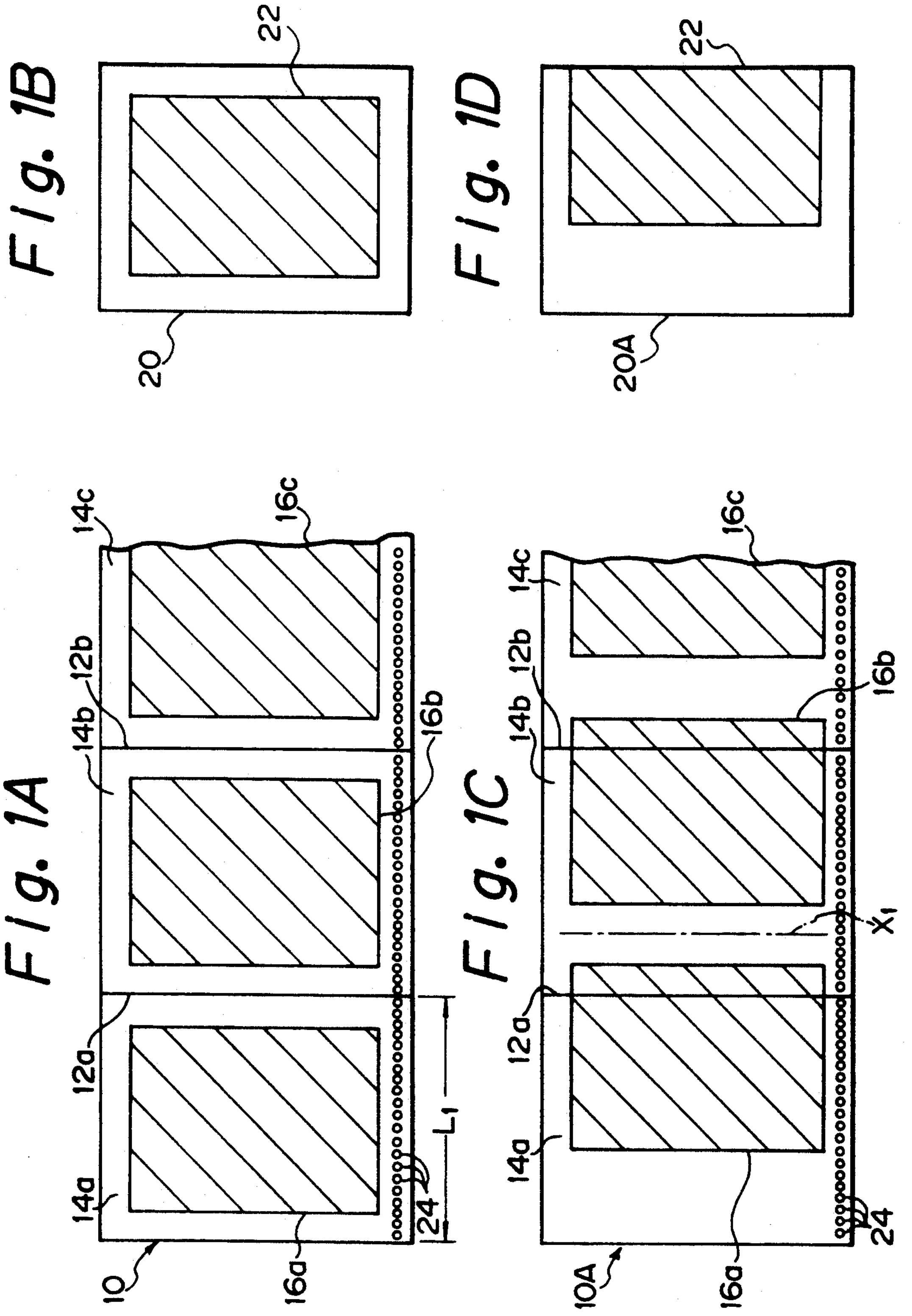
FIGS. 1A and 1C show CF paper having multiple print areas thereon.
FIG. 1B shows a copy sheet on which an image is reproduced in an accurate position.
FIG. 1D shows a copy sheet on which an image is deviated from the accurate position.

Assume an electrophotographic copier or similar image recorder on which is mounted an ADF of the type capable of feeding a document in the form of CF paper. When a document in the form of CF paper is to be copied, the ADF automatically feeds the document, the first page being the first, toward a glass platen of the image recoder via an inlet which is formed in the ADF, in exactly the same manner as with ordinary documents. After the first page has been illuminated for imagewise exposure, the CF paper is transported until the second page reaches the platen. After the second page has been stopped on the platen, it is illuminated in the same manner as the first page. In this construction, images printed on predetermined areas of individual pages of CF paper are sequentially fed page by page onto the platen to produce desired copies. Specifically, as shown in FIG. 1A, assume that CF paper 10 has image areas or print areas 16*a*, 16*b*, 16*c*, . . . which are individually accurately located in predetermined positions on consecutive pages 14*a*, 14*b*, 14*c*, . . . which in turn are delimited by folds 12*a*, 12*b* . . . . Then, the print areas can be succesfully copied to obtain complete reproductions, as represented by a copy 20 having an image 22 in FIG. 1B. However, it often occurs that images are not printed in predetermined positions on the consecutive pages 14*a*, 14*b*, 14*c* . . . of the CF paper 10A, e.g., each of the print areas 16*a*, 16*b*, 16*c*, . . . extends over two nearby pages, as shown in FIG. 1C. When the prior art ADF is operated to automatically feed such CF paper 10A from the first page 14*a*, stop it in a predetermined position on the platen, and copy it, the image 22 will be partly lost on the resulting copy as represented by a copy 22A in FIG. 1D.

The above occurrence will be eliminated if the operator sets the first print area 16*a* of the first page 12A of the CF paper 10A in a predetermined position on the platen by hand, copies the first page 12A, and then activates the ADF for automatically feeding the ADF paper 10A page by page. Then, all the print areas 16*a*, 16*b*, 16*c* . . . will be accurately reproduced on copies, as shown in FIG. 1B.

The prior art ADF has a sensor located downstream of the platen and responsive to sprocket holes 24 (FIGS. 1A and 1C) which are formed through CF paper, so that the CF paper may be automatically fed page by page. Specifically the sensor senses a particular number of sprocket holes which are representative of one page of CF paper. The sensor, therefore, allows CF paper to be transported one page at a time, then stopped on the platen, and then copied. The location of the sensor downstream of the platen allows even the last page of CF paper to be accurately controlled with respect to transport and stop.

However, a problem with the above-stated manual setting scheme is that the position of the first page on the platen slightly changes depending upon the position of the print area 16*a* provided on the first page. That is, the first page of CF paper cannot always be set as precisely in a predetermined position on the platen as the CF paper 10 which is automatically fed from the first page. Hence, it is impossible to transport CF paper accurately by one page and then stop it on the platen, on the basis of an output of the sensor which is located downstream of the platen. While the sensor may be located upstream of the platen in order to eliminate this problem, then the sensor would fail to control the transport and provide for the stopping of the last page of CF paper, as discussed previously, due to the distance between the platen and the sensor.

Preferred embodiments of the ADF in accordance with the present invention will be described hereinafter.

First Embodiment

Figure 2:
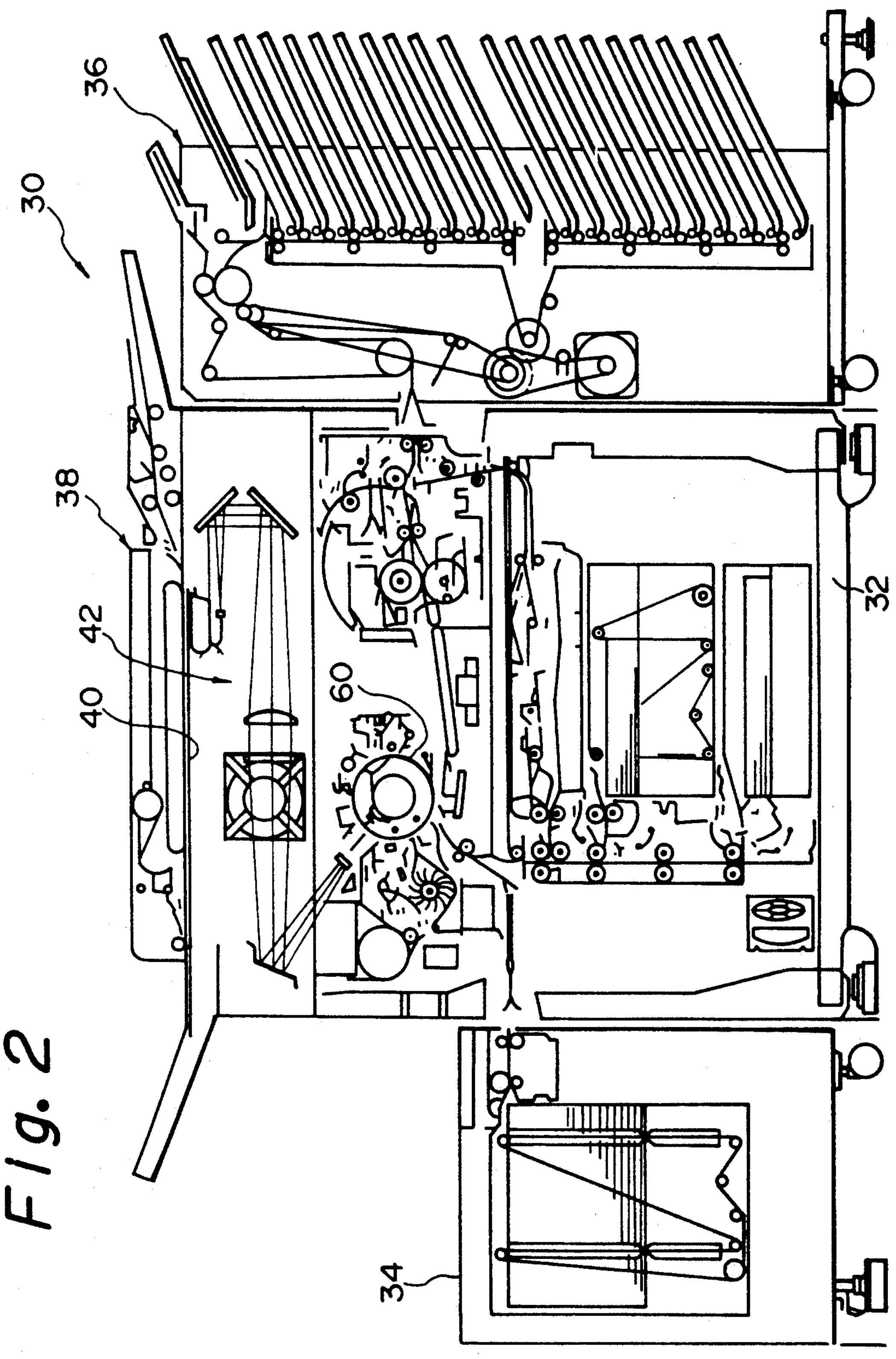
FIG. 2 is a section showing the overall construction of an electrophotographic copier which belongs to a family of image recorders to which an ADF in accordance with the present invention is applicable.

Referring to FIG. 2, an electrophotographic copier which belongs to a family of image recorders and is implemented by a first embodiment of the present invention is shown. The copier, generally 30, is generally made up of a copier body 32, a mass paper feed unit 34, a sorter 36, and an ADF 38 representative of the illustrative embodiment. The copier body 32 has a glass platen 40 on which the ADF 38 is mounted for feeding a document to the glass platen 40. Optics 42 illuminates a document support surface of the glass platen 40 to reproduce a document on a paper sheet which is fed from the mass paper feed unit 34. The resulting copies are sorted by the sorter 36.

Figure 3:
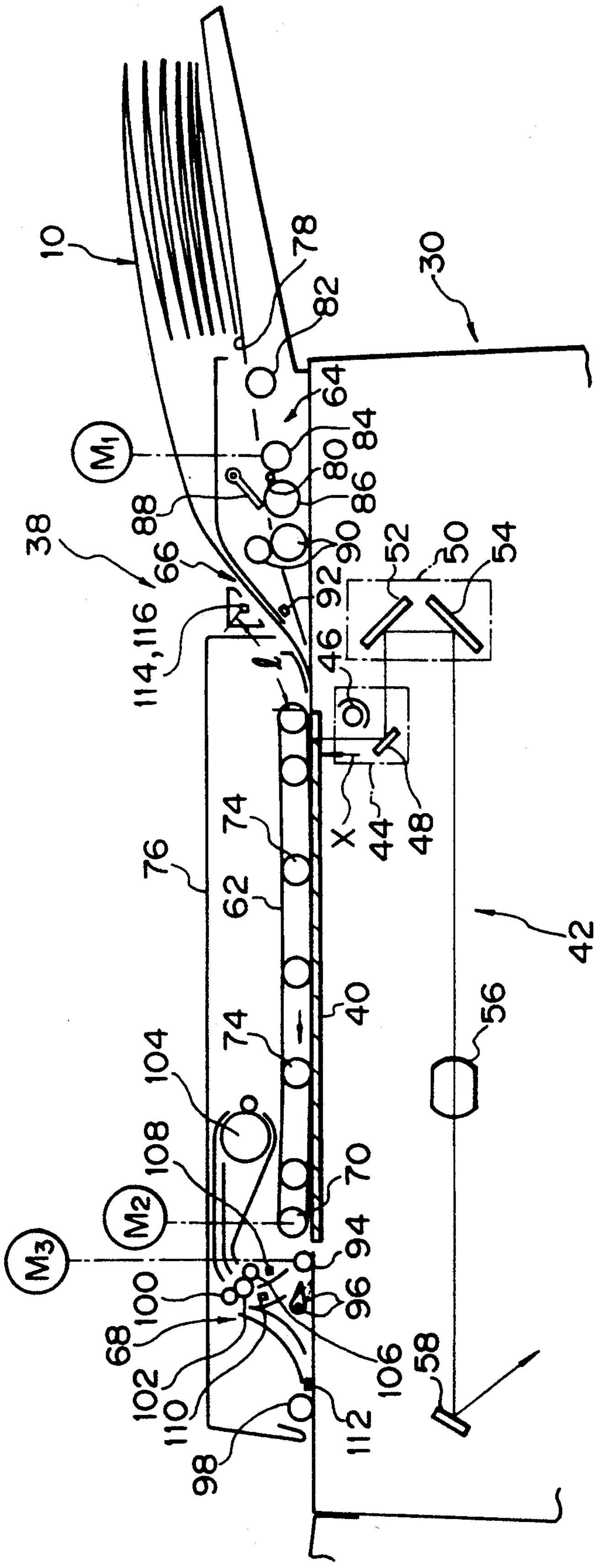
FIG. 3 is a section showing a part of the copier shown in FIG. 2 and a first embodiment of the ADF in accordance with the present invention.

FIG. 3 shows the ADF 38 in detail. In the figure, a document fed in a specific manner as will described is laid on the glass platen 40. The optics 42 located below the platen 40 has a first scanner 44 loaded with a light source 46 and a first mirror 48, a second scanner 50 loaded with a second mirror 52 and a third mirror 54, a lens 56, and a fourth mirror 58. The scanners 44 and 50 are individually moved to the left away from their home positions shown in the figure, so that the document laid on the platen 40 is illuminate by light issuing from the light source 46. A reflection from the document is sequentially reflected by the first to third mirrors 38, 52 and 54, then propagated through the lens 56, and then reflected by the fourth mirror 58, which is fixed in place, to reach a photoconductive element 60 (FIG. 2). As a result, a latent image representative of the document is electrostatically formed on the photoconductive element 60. The latent image is developed by a conventional procedure which uses toner. The resulting toner image on the photoconductive element 60 is transferred to a paper sheet to produce a copy 20 as shown in FIG. 1B.

Referring to FIG. 3, a specific construction of the ADF 38 is shown. In the illustrative embodiment, the ADF 38 has a transport member in the form of a belt 62 which is located to face the glass platen 40. An ordinary document feed unit 64 feeds ordinary sheet documents (hereinafter referred to as ordinary documents) one by one to the platen 40. A CF paper inlet 66 is provided so that CF paper 10 may be fed toward the platen 40 via the inlet 66. A document discharge unit 68 drives a document coming out of the platen 40 after illumination to the outside of the ADF 38. The belt 62 is passed over a drive roller 70, a driven roller 72, and a number of presser rollers 74. The drive roller 70 is driven in a clockwise rotational motion by a motor M2 which is schematically shown in FIG. 3. The belt 62 is rotatable as indicated by an arrow A in the figure, transporting a document on and along the platen 40.

A cover 76 accommodates the belt 62, rollers 70, 72 and 74 and document discharge unit 68 and is supported by the copier body 32 to be rotatable integrally with those rollers and unit. The cover 76 may be raised away from the platen 40 to access the platen 40, so that a document may be laid on the platen 40 by hand as needed.

A specific operation of the ADF 38 for causing the ordinary document feed unit 64 to feed an ordinary document automatically and an arrangement associated with such an operation will be described.

First, a main switch (not shown) of the copier 30 is turned on, and a stack of sheet documents (not shown) are loaded on a document table 78. The paper feed unit 54 has a document set sensor 80 which is turned on by the leading edges of the documents. When a print switch (not shown) of the copier 30 is pressed, the copier 30 feeds a document feed command to the ADF 38. This causes the ADF 38 begin to operate, i.e., pick-up rollers 82 and 84 of the document feed unit 64 are rotated counterclockwise to move a sheet document forward. At the same time, a separator roller 86 is rotated counterclockwise and, in cooperation with a separator blade 88 which is pressed against the roller 86 feeds only the lowermost sheet document out of the stack toward a pull-out roller pair 90. This roller pair 90 drives the sheet document toward the platen 40. The rollers 82, 86 and 90 are driven by a motor M1 which is schematically shown in FIG. 3.

As soon as the leading edge of the document fed out of the stack reaches the platen 40, the document is transported on and along the platen 40 by the belt 62 which is rotating in the direction A. When the trailing edge of the document moves away from a register sensor 92, the sensor 92 senses it. Thereafter, as the sheet document is moved by a predetermined distance, the belt 62 is brought to a halt so that the sheet document becomes stationary on the platen 40. At this instant, the trailing edge of the sheet document is located at a reference position X on the platen 40. This control is effected by an encoder E2 which is associated with the drive motor M2, as described later in detail.

Then, the scanners 40 and 50 are operated so that the document on the platen 46 is illuminated by the light source 46. This is followed by the previously mentioned sequence of copying steps. When a predetermined number of copies are produced with the above document, the copier 30 delivers a feed command to the ADF 38 for feeding the next sheet document, while feeding a discharge command to the ADF 38 for discharging the preceding sheet document. In response, the feed unit 64 feeds the next sheet document while, at the same time, the belt 62 is driven again in the direction A. As a result, the illuminated sheet document is driven out of the platen 40 and then out of the ADF 38 by the discharge unit 68. The procedure described above is repeated to feed the stack of documents one by one automatically.

Figure 4A:
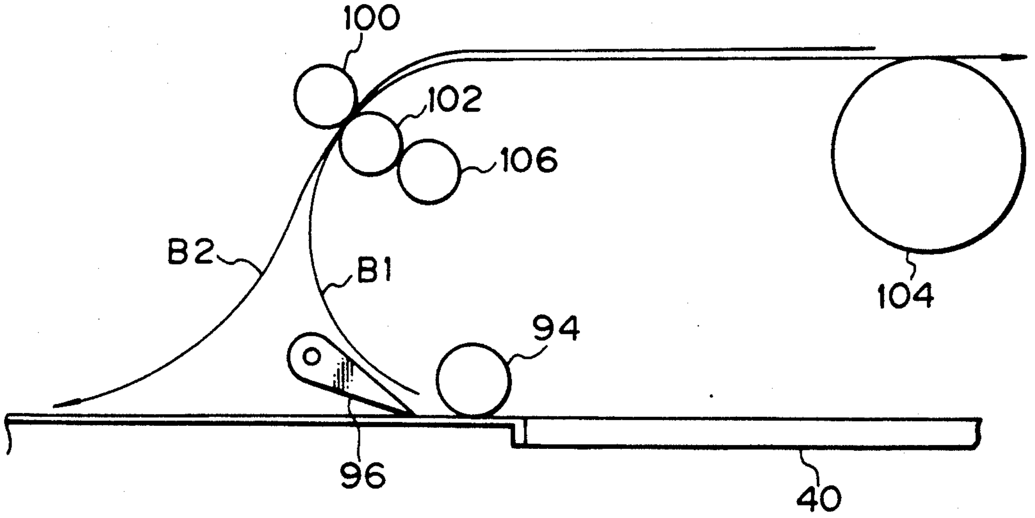
FIGS. 4A and 4B are schematic diagrams each showing a specific manner of discharging an ordinary sheet document.
Figure 4B:
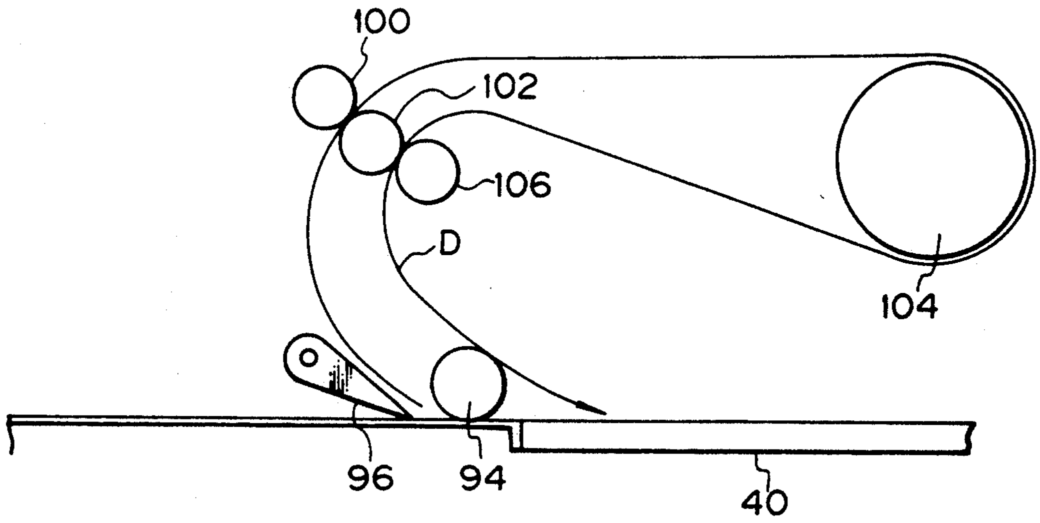

The document discharge unit 68 has an intermediate transport roller 94 which transports a document coming out of the platen 40. When the sheet document is to be directly discharged to the outside of the ADF 38, a selector pawl 96 located downstream of the roller 94 is held in a position indicated by a solid line in the figure. In this condition, the sheet document is continuously transported to the left by the roller 94 and a discharge roller 98 which is located downstream of the roller 94. When the sheet document is to be discharged face down, the selector pawl 96 is switched to a position indicated by a phantom line in the figure. Then, the sheet document coming out of the platen 40 is steered by the selector pawl 96 toward a first and a second reversal rollers 100 and 102, and then further transported by the reversal rollers 100 and 102, as indicated by an arrow B in FIG. 4A. Thereupon, the rotating directions of the coactive rollers 100 and 102 are reversed to discharge the sheet document to the outside of the ADF 38, as indicated by an arrow B2 in FIG. 4A. When an image is printed on the back of the sheet document and is to be copied also, the next sheet is not fed from the feed unit 64 and, instead, the sheet document coming out of the reversal rollers 100 and 102 is transported wrapping around a turn roller 104. The sheet document is then caught by the second reversal roller 102 and a third reversal roller 106 to be thereby returned to the platen 40. This allows the image printed on the back of the sheet document to be copied. A motor M3 schematically shown in FIG. 3 is adapted to drive the above-mentioned rollers of the document discharge unit 68. A reversal registration sensor 108, a reversal inlet sensor 110 and a paper discharge sensor 112 are disposed in the illustrated positions of the discharge unit 68.

To enhance efficient copying operations, an arrangement may be so made as to begin feeding the sheet document subsequent to the document lying on the platen and, thereafter, discharge the preceding document from the platen 40. Although this causes a part of the preceding document to remain on the platen 40 when the subsequent document is brought to a halt on the platen 40, the former document is surely discharged by the intermediate transport roller 94.

The operation of the ADF 38 with a document in the form of CF paper will be described together with an arrangement associated therewith.

In this case, the CF paper 10, 10A shown in FIGS. 1A and 1C is inserted by hand in the CF paper inlet 66 which is provided independently of the document feed unit 64. So long as the print areas **16*a*, 16*b*, 16*c*, . . . are formed in predetermined positions on the CF document 10 (FIG. 1A), the first page 14*a* of the CF paper 10 is set on the platen 40 with the first fold 12*a* being held in register with the reference position X of the platen 40. As shown in FIG. 1C, when the print areas are deviated from the predetermined positions, the CF document is set on the platen 40 with the fold 12*a* being deviated from the reference position X. Specifically, the intermediate X1 between the nearby print areas 16*a* and 16*b* is held in register with the reference position X. As shown in FIG. 3, the remaining part of the CF paper 10 may be folded and laid on the table 78** or any other suitable place.

The manipulation stated above is easy to perform because the cover 76 can be raised to expose the platen 40.

After the CF paper 10 has been set on the platen 40 by hand, the cover 76 is closed and, then, the main switch and print switch of the copier 30 are pressed. Then, the copier 30 delivers a feed command to the ADF 38. However, none of the belt 62 and discharge unit 68 operate in response to the feed command and, therefore, the CF paper 10 remains stationary on the platen 40, as described in detail later. While the CF paper 10 is held in a halt on the platen 40, the first print area 16*a* is reproduced by the previously described procedure to produce a desired number of copies 20 shown in FIG. 1B. As the illumination of the first print area 16*a* is completed, the copier 30 delivers a discharge command to the ADF 38. In response, the motors M2 and M3 (FIG. 3) are energized to move the belt 62 in the direction A while starting driving the rollers of the discharge unit 68. In this instance, the selector pawl 94 is continuously held in the solid-line position of FIG. 3 so that the CF paper 10 is transported horizontally by the intermediate roller 94 and discharge roller 98. Consequently, the print area 16*b* on the second page of the CF paper 10 is transported toward the platen 40.

A first sensor 114 and a second sensor 116 are located upstream of the platen 40 with respect to the direction of CF paper transport, i.e., between the document inlet 66 and the platen 40 in the illustrative embodiment. The first sensor 114 is responsive to the sprocket holes 24 of the CF paper 10; the transport and stop of the CF paper 10 are controlled on the basis of output pulses of the sensor 114. The second sensor 116 is adapted to determine whether or not the CF paper 10 is in a position where it can be sensed by the first sensor, or sprocket hole sensor, 114. In the illustrative embodiment, the two sensors 114 and 116 are arranged side by side in a direction perpendicular to the sheet surface of FIG. 3. The distance l between the position where the sensors 114 and 116 sense the CF paper 10 and the platen 40 is selected to be equal to or smaller than the length L1 (FIG. 1A) of one page of the CF paper 10. Guide members (not shown) are disposed along the transport path between the document inlet 66 and the platen 40 for the purpose of guiding the opposite edges of the CF paper 10 which is apt to be fed askew, but members for driving the CF paper 10 are not provided there.

As the CF paper 10 begins to be transported after the reproduction of the first page 16*a*, the sprocket sensor 114 senses the sprocket holes 24 of the CF paper 10. At the instant when the number of output pulses of the sensor 24 reaches a predetermined number associated with one page of the CF paper 10, e.g., twenty-two, the motors M2 and M3 are deenergized to stop the movement of the CF paper 10. At this time, the second print area 16*b* of the CF paper 10 has been located in the predetermined position on the platen 40. In this condition, the print area 16*b* is illuminated to produce a copy. When a desired number of copies are produced with the print area 16*b*, the CF paper 10 is driven again by the previously discussed manner until the third print area 16*c* reaches the predetermined position on the platen 40. While the print areas 16*a*, 16*b*, 16*c*, . . . are sequentially copied with the CF paper 10 being controlled on the basis of the outputs of the sprocket hole sensor 114 with respect to transport and stop, the second sensor or CF paper sensor 116 continuously senses the presence of the CF paper 10. As soon as the trailing edge of the last page of the CF paper 10 moves away from the sensors 114 and 116, the sensor 114 cannot sense sprocket holes 24 any longer and therefore would prevent the transport and stop of the CF paper 10 from being controlled.

In the light of the above, from the time when the sprocket sensor 114 stops producing an output pulse, the control over the transport and stop of the CF paper 10 is automatically handed over from the CF paper sensor 116 to a control device which may include timer or a pulse generator. Then, despite that the sprocket sensor 114 does not sense any sprocket hole 24, the CF paper 10 can be brought to a stop when a predetermined period of time expires or when a predetermined number of pulses appear after the trailing edge of the last page has moved away from the CF paper sensor 116. This allows the print area on the last page of the CF paper 10 to be accurately positioned on the platen and copied. After the theprint area of the last page has been fully copied, the CF paper 10 is bodily driven out of the ADF 38.

Figure 5:
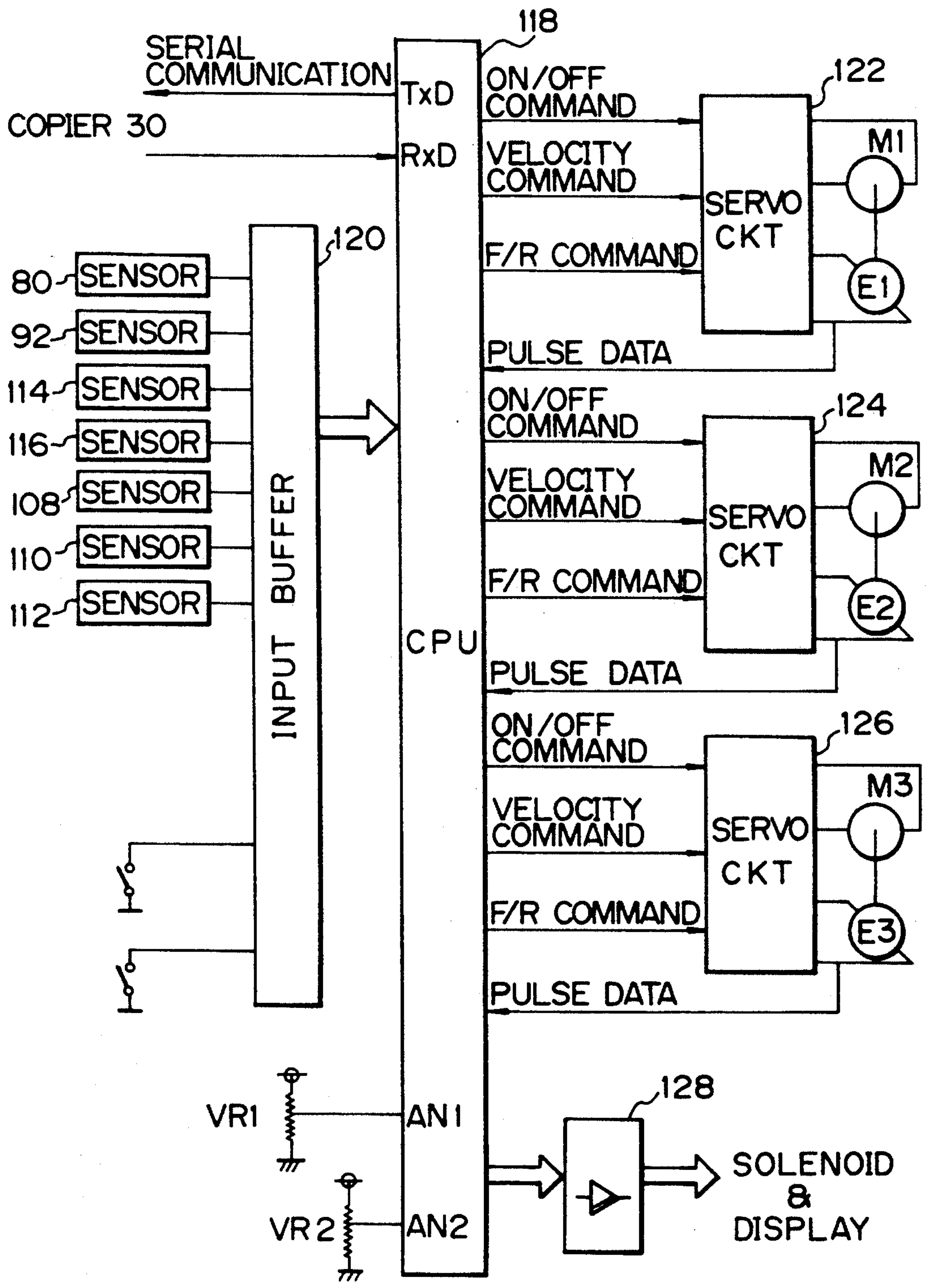
FIG. 5 is a schematic block diagram showing a control circuit associated with the ADF of FIG. 3.

Referring to FIG. 5, a control circuit associated with the ADF 38 for implementing the above-stated operations is shown in a schematic block diagram. In the figure, the ADF 38 has a CPU 118 which interchanges data with the copier 30 by serial communication. The outputs of ths sensors 80, 92, 114 and 116 as well as the outputs of other various sensors disposed in the discharge unit 68 are fed to the CPU 118 via an input buffer 120. Each sensor may advantageously be implemented by a light emitting diode and a phototransistor. The motors M1, M2 and M3 are respectively driven via servo circuits 122, 124 and 126 to which the CPU 118 delivers motor ON/OFF commands, motor velocity commands (6-bit data), and forward/reverse direction commands. A solenoid for actuating the selector pawl 96, a display and so forth are driven by a driver 128 in response to commands which are also fed from the CPU 118. The servo circuits 122, 124 and 126 use output pulses of encoders E1, E2 and E3 of their associated motors M1, M2 and M3 for the velocity controlling pulse, while feeding pulse data to the CPU 118. The CPU 118 controls the position of the document on the basis of the incoming pulse data. A part of the pulse data is used to sense errors which may occur in the motors M1, M2 and M3.

The CPU 118 has analog ports (e.g. $\mu$PD 7810 available from NEC). Variable resistors VR1 and VR2 are connected to analog ports AN1 and AN2, respectively. The resistance values of the variable resistors VR1 and VR2 are fed to the CPU 118 at a resolution of "256" to implement the control over the document stopping position. Such a configuration is successful in compensating for some scattering among ADFs. Specifically, assuming that in a certain ADF the number of pulses appearing from the instant when a sheet document moves past the register sensor 92 to the instant when it reaches the reference position X (FIG. 3) is 640, the variable resistor VR1 may be so adjusted as to produce such a number of pulses. In the software aspect, the adjustment may be made by using 600 pulses as a fixed value and adding the analog value of the variable resistor VR1 to 600.

Hereinafter will be described specific procedures associated with the control over the transport and stop of the CF paper 10. The mode for feeding the CF paper 10 will be referred to as "CFF mode" for convenience.

Figure 6:
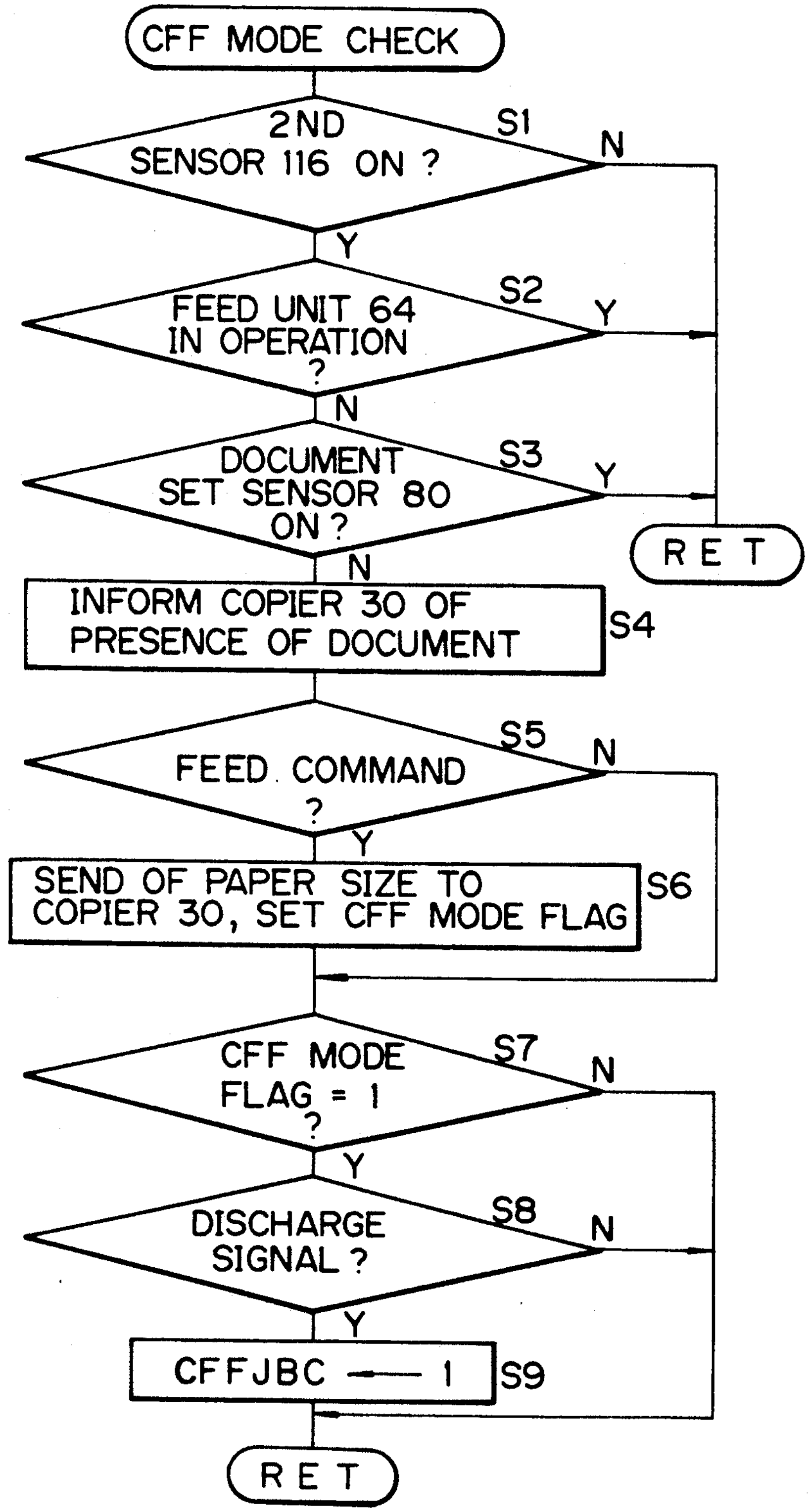
FIGS. 6 through 16 are flowcharts demonstrating specific operations which are performed in a CFF mode.

FIG. 6 shows a "CFF mode check" routine for determining whether or not the operation enters into the CFF mode. When the CF paper 10 is inserted in the inlet 66, the CF paper sensor 116 is turned on (step S1). In this condition, if the feed unit 64 for feeding an ordinary sheet document is not operative (S2) and if a sheet document is not laid on the table 78, i.e., the document set sensor 80 is not turned on (S3), the operation enters into the CFF mode. This indicates that the operation for feeding an ordinary sheet for copying it has priority over the operation which handles the CF paper 10. When all the above conditions are satisfied, the ADF 38 sends a command representative of the presence of a document to the copier 30 (S4). The copier 30 then knows that the ADF 38 is loaded with a document. When the print switch of the copier 30 is pressed, the copier 30 sends a feed command to the ADF 38 (S5). If the document is an ordinary document, the ADF 38 will start feeding it immediately in response to the feed command. In the CFF mode, however, the feeding operation does not begin, as stated earlier; the ADF 38 sends the size of CF paper to the copier 30 in response to the feed command from the copier 30 (S6). The copier 30 uses this information for the automatic selection of paper sheets and the automatic selection of a magnification.

In response to the feed command, the ADF 38 sets a CFF mode flag (S6). This flag is adapted to determine that the CFF mode has been established. In this manner, despite the arrival of a feed command from the copier 30, the ADF 38 seemingly does not operate in the CFF mode. The copier 30, therefore, does not have to discriminate an ordinary sheet document and the CF paper 10, achieving a simplified control arrangement. Of course, the ADF 38 may inform the copier 30 of the fact that the CF paper 10 has been set to allow the latter to perform a particular control associated with the CF paper 10.

After the set state of the CFF mode flag has been confirmed (S7), the first print area 16*a* of the CF paper 10 is illuminated for the purpose of producing a copy. After the illumination, the copier 30 sends a discharge command to the ADF 38 for instructing the latter to discharge a copied document (S8). In response, the ADF 38 loads CFFJBC (CFF job counter) with 1 (one) in order to perform an operation for transporting and stopping the CF paper 10 (CFF job) (S9). A sequence of operations which follows the step S9 will be described with reference to FIGS. 8 to 16 later.

Figure 7:
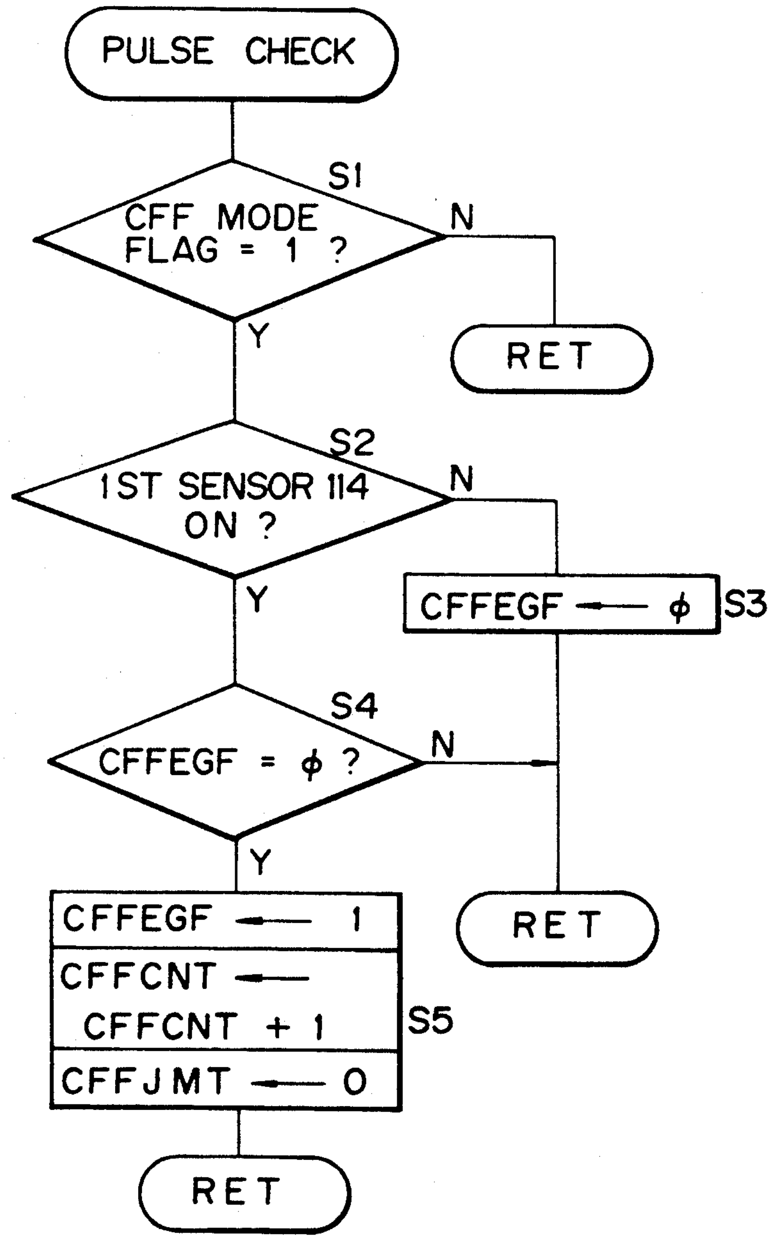
Figure 17:
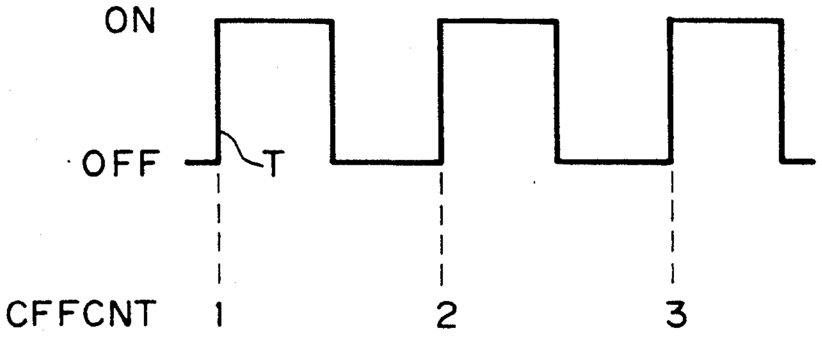
FIG. 17 plots a waveform of an output of a first sensor shown in FIG. 3.

FIG. 7 shows a "CFF pulse check" routine which begins with a step S1 for determining whether or not the CFF mode flag is set. If it is set, whether or not the sprocket hole sensor 114 is turned on is determined (S2). Specifically, assuming that the sensor 114 produces pulses shown in FIG. 17 when it senses the sprocket holes 24, whether the sensor 114 is in an ON state representative of a sprocket hole 24 or in an OFF state is determined. If the sensor 114 is in an OFF state, CFFEGF (CFF edge flag) is reset (S3). If the ensor 114 is in an ON state, whether or not CFFEGF is set is determined (S4) and, if it not set, it is set (S5). At the same time, CFFCNT (CFF counter) counts the sprocket holes 24 which are sensed by the sprocket hole sensor 114 (S5). Further, a counter (or timer) CFFJMT responsive to jams of the CF paper 10 is cleared, as described in detail later.

As shown in FIG. 7, the counter CFFCNT counts a sprocket hole 24 and the counter or timer CFFJMT is cleared, each at the leading edge of a sprocket hole 24. More specifically, they occur at the positive-going edge T of a pulse shown in FIG. 17, i.e., when the leading edge of a sprocket hole 24 is sensed. Hence, even if the sprocket sensor 114 is in an ON state, the operations represented by the step S5 in FIG. 7 are not executed when CFFEGF is set, i.e., such operations are performed at the positive-going edge of a pulse without exception. By such a procedure, the sprocket holes 24 are counted while being sensed by the sensor 114.

FIGS. 8 to 16 show what kind of operations occur in association with the count of the CFF job counter CFFJBC.

Figure 8:
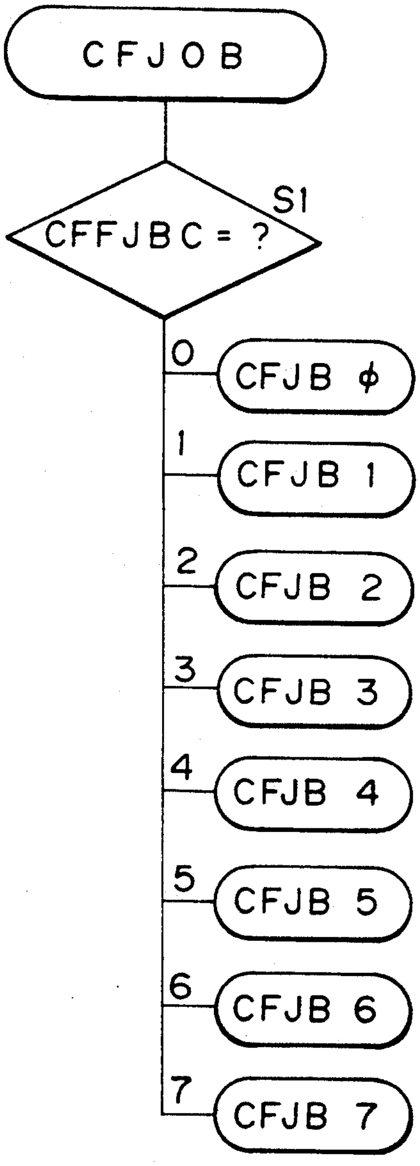
Figure 9:
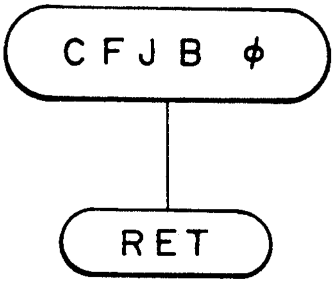
Figure 10:
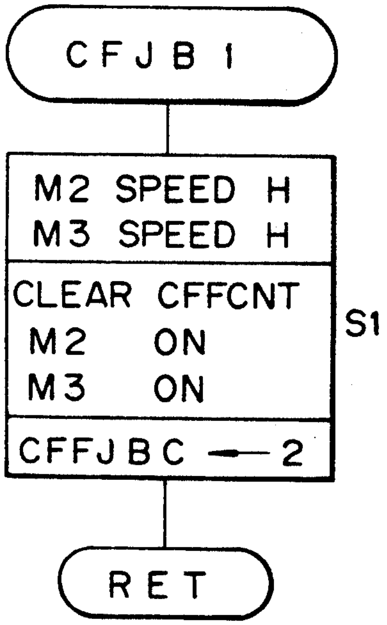

As stated with reference to FIG. 6, when the ADF 38 receives a discharge signal (S8, FIG. 6), CFFJBC is set to "1" so that multi-jump occurs on the basis of a "CFJOB" routine shown in FIG. 8 and the count of CFFJBC. If CFFJBC is "1", the program jumps to a "CFJB1" routine shown in FIG. 10. In this routine, the velocity commands associated with the belt drive motor 62 and the discharge unit drive motor M3 are so selected as to set up a high speed state H, and the motors M2 and M3 are energized. At the same time, the counter CFFCNT responsive to the sprocket holes 24 being sensed by the sprocket hole sensor 114 is cleared, and CFFJBC is loaded with "2" (S1, FIG. 10). By such a procedure, the CF paper 10 is transported so that its first page begins to be discharged from the platen 40.

Figure 11:
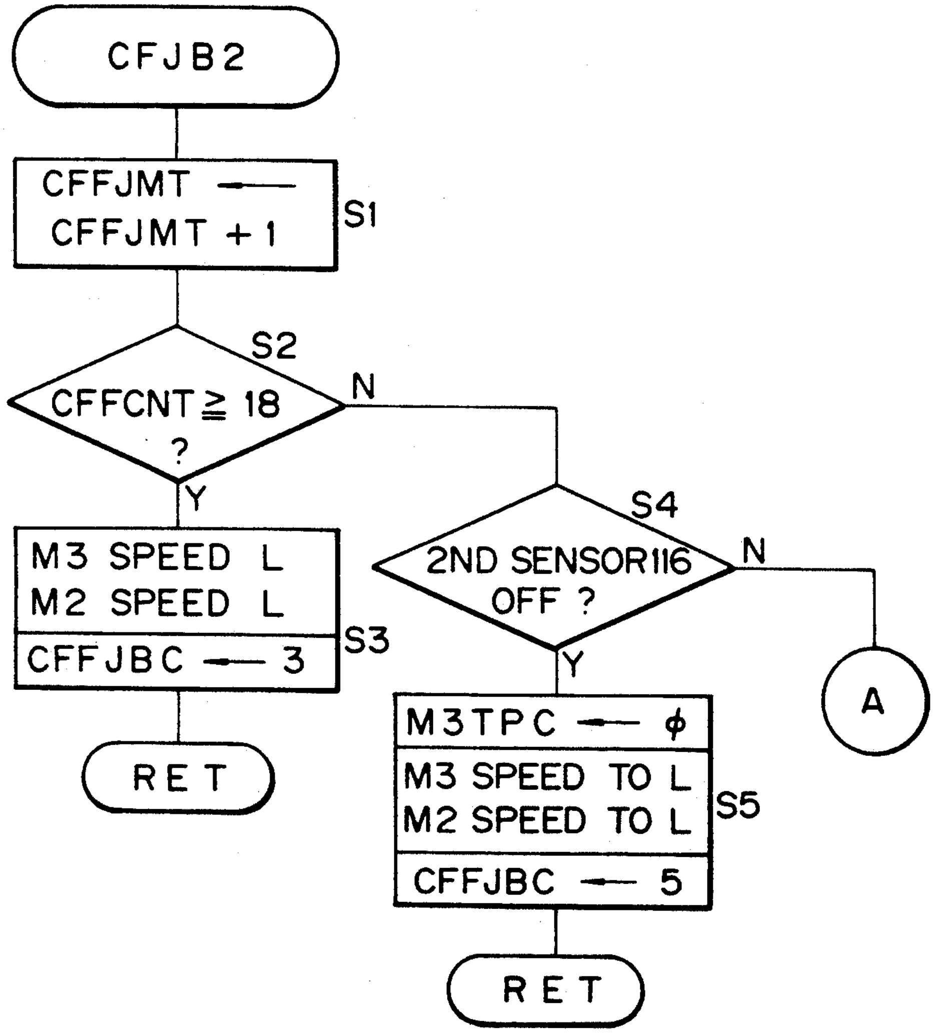

As CFFJBC is incremented to "2" (see FIG. 8 also), "CFJB2" shown in FIG. 11 is executed on the basis of the multi-jump of "CFJOB". Every time the program enters into this routine, the jam counter CFFJAMT is incremented (S1, FIG. 11), as will be described also. When a predetermined number of sprocket holes 24 are counted up, the velocity of each motor M2 and M3 is switched from high H to low L and, at the same time, CFFJBC is incremented to "3" (S2 and S3). In the illustrative embodiment, it is assumed that one page of of CF paper 10 is 22.11 inches long, and twenty-two sprocket holes 24 are formed per page. The above operation is executed when eighteen sprocket holes 24 are counted. Switching the rotation speed of the motors M2 and M3 from high to low before one page of the CF paper 10 is fully transported as mentioned above is successful in causing the paper 20 to stop at the predetermined position accurately. What occurs when the count of CFFCNT is less than eighteen as determined in the step S2 of FIG. 11 will be described later.

Figure 12:
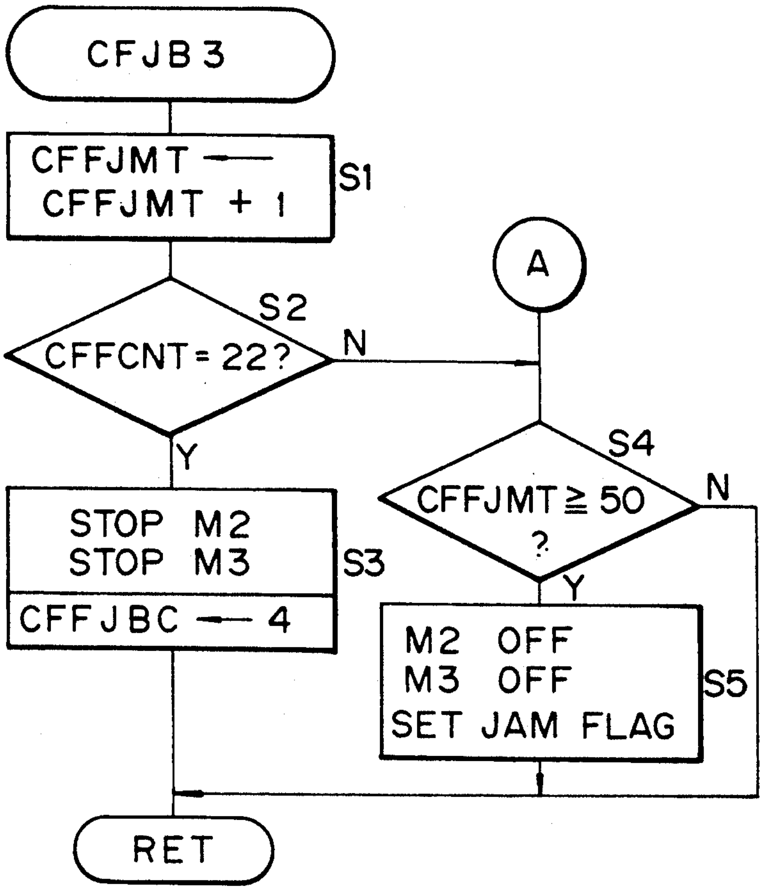

As the CFJB becomes "3" (see FIG. 8 also), CFFJMT is incremented, as shown in FIG. 12 and as will be described (S1). When the counter CFFCNT counts up twenty-two sprocket holes representative of one page (S2), the motors M2 and M3 are braked to stop them rapidly. After this processing, CFFJBC is loaded with "4" (S3).

Figure 13:
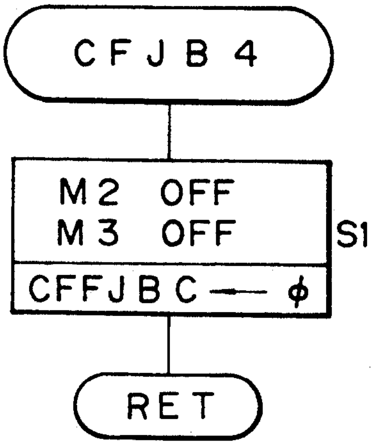

As shown in FIG. 13, in a "CFJB4" routine, the CF paper 10 is stopped, the ON/OFF commands for the motors M2 and M3 are turned from ON to OFF, and CFFJBC is reset to "0" (S1).

By the above sequence of steps, the second print area 16*b* of th CF paper 10 is set in the predetermined position on the platen 40 and then copied. Then, the operations described above are repeated.

Figure 14:
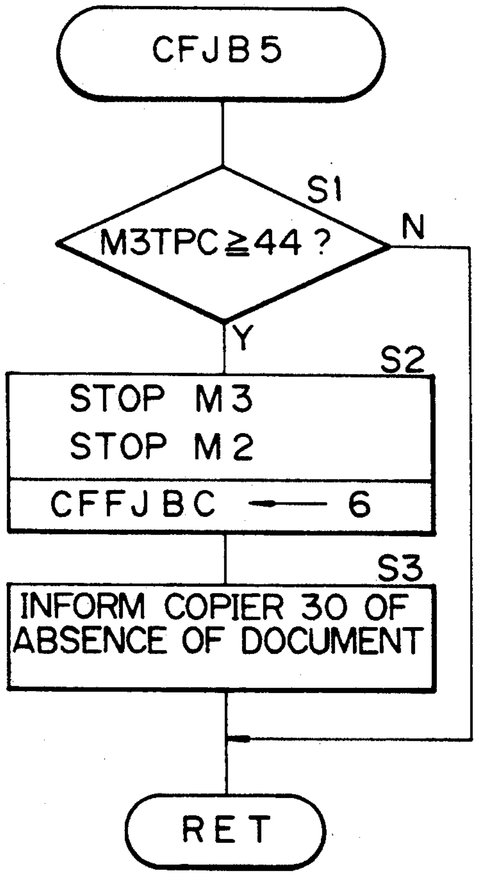

Assume that the count of the counter CFFCNT is less than eighteen as determined in the step S2 of FIG. 11, and that the second sensor or CF paper sensor 10 is turned off (step S, FIG. 11). This suggests that the trailing edge of the last page of the CF paper 10 has moved away from the CF paper sensor 116. In this condition, the CF paper transport and stop control implemented by the first sensor or sprocket hole sensor 114 and counter CFFCNT is disabled. Such a control, therefore, is handed over to the encoder E3 (FIG. 5) which is associated with the motor M3, i.e., the control is automatically handed from the sprocket hole sensor 114 and counter CFFCNT over to the encoder E3 which is a specific controller. This switchover is effected by a command from the CPU. Specifically, when the CF paper sensor 116 is in an OFF state as determined in the step S4 of FIG. 11, a counter M3TPC responsive to output pulses of the encoder E3 is cleared, the speed of the motors M2 and M3 are switched to low L, and CFFJBC is loaded with "5". This is followed by a "CFJB5" routine which is shown in FIG. 14. Again, reducing the rotation speed of the motors M2 and M3 as mentioned above is effective to stop the CF paper 10 at the predetermined position accurately.

In the "CFJB5" routine, whether or not the counter M3TPC has reached a predetermined number, which is "44" in the illustrative embodiment is determined (S1, FIG. 14). This count is associated with the interval between the time when the counter M3TPC begins to count pulses and the time when the print area of the last page of the CF paper 10 reaches the predetermined position on the platen 40. At this time, therefore, the motors M2 and M3 are rapidly braked to a stop, whereby the CF paper 10 is stopped (S2). CFFJBC is loaded with "6" (S2), and a command representative of the absence of the document is sent to the copier 30 to show the latter that the page is the last page of the CF paper 10.

Figure 15:
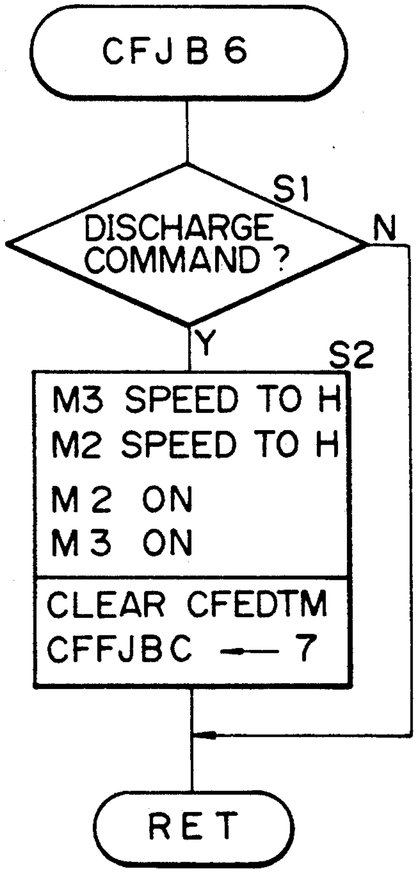

As shown in FIG. 15, in the "CFJB6" routine, in response to a discharge command sent from the copier 30 after the illumination of the last page (S1), the motors M2 and M3 are operated at a high speed H to discharge the CF paper 10 (S2). CFFJBC is loaded with "7", and a timer CFEDTM (computer form end timer) is cleared (S2).

Figure 16:
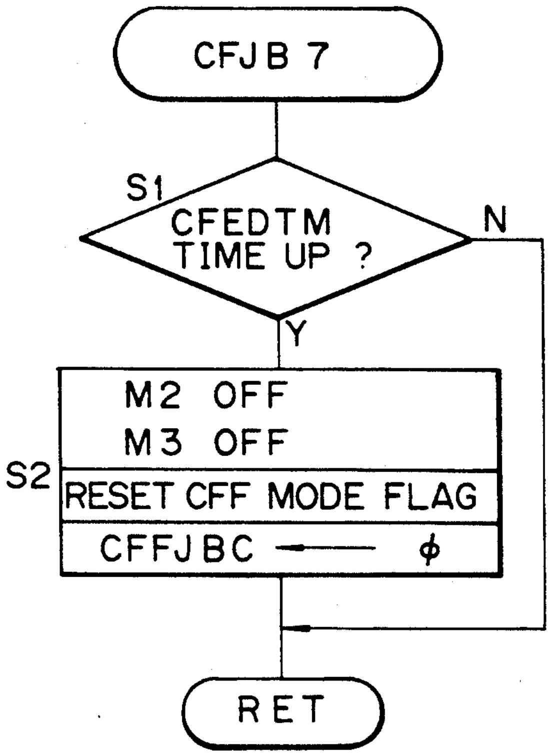

In a "CFJB7" routine shown in FIG. 16, after the time-up of the timer CFEDTM (S1), the motors M2 and M3 are denergized, the CFF mode flag is reset, and CFFJBC is cleared to "0". This is the end of a sequence of CFF mode operations.

Concerning the overall flow, CFFJB0 to CFFJB$ are repeated so long as the CF paper 10 is continuously copied and, for the last page only, CFFJB0, CFFJB2, CFFJB2, CFFJB5, CFFJB6 and CFFJB7 are executed.

The counter CFFJMT cleared in the step S5 of FIG. 7 is incremented every time each of "CFJB2" and "CFJB3" is executed. Specifically, this counter is cleared every time the sprocket hole sensor 114 senses a sprocket hole 24. When the counter counts a longer period of time than the period of time which the portion intervening between the leading edges of two nearby sprocket holes 24 of the CF paper 10 being transported without a jam would need to move past the sensor 114, 50 in the illustrative embodiment, the program determines that the CF paper 10 has jammmed the ADF 38. More specifically, in the "CFJB3" routine shown in FIG. 12, before the counter CFFCNT reaches 22 representative of one page of the CF paper 10, the counter CFFJMT is checked (S4, FIG. 12). When the counter CFFJMT counts 50, the program determines that the CF paper 10 has jammed the ADF 38, deenergizes the motors M2 and M3, and sets a jam flag which is used for various kinds of jam processing (S5, FIG. 12). So long as the CF paper 10 is transported without a jam, the counter CFFJMT is necessarily cleared before counting fifty pulses. For example, assume that the pitch of the sprocket holes 24 is ½ inch, that the sprocket hole sensor 114 senses sprocket holes 24 at the intervals of about 20 milliseconds to 30 milliseconds, that the counter CFFCNT counts the outputs of the sensor 114, and that the counter CFFJMT is incremented every 2 milliseconds to 3 milliseconds. Then, CFFJMT is cleared every time it counts ten to fifteen pulses and does not reach 50 pulses. Stated another way, when a sprocket hole 24 of the CF paper 10 is not sensed more than 100 milliseconds to 150 milliseconds, a jam is detected and, as stated previously, the motors M2 and M3 are deenergized.

The ADF 38 of the illustrative embodiment is capable of turning over an ordinary sheet document which carries images on both sides threrof for sequentially copying the images, as stated earlier. In addition, the copier 30 has a two-sided copying function available for forming images on both sides of a paper sheet. On the other hand, data are printed out only on one side of a CF paper without exception. In such a situation, when the operator desires to produce a two-sided copy by using the CF paper 10, the operator is expected to select a copy mode by manipulating keys which allow a two-sided copy to be produced from a one-sided document. However, it may occur that the operator inadvertently selects a mode which produces a two-sided copy from a two-sided document. Therefore, in order that a two-sided copy may be attained even under such a condition, an arrangement is preferably be made such that even when a document reversal command or a face-down discharge command is fed from the copier 30, the same processing as would be executed in response to a discharge signal as indicated in the step S8 of FIG. 6 is effected.

In summary, in the ADF 38, the sprocket hole sensor 114 is located upstream of the platen 40. Hence, even if the first page of the CF paper 10 is set on the platen 40 by hand and the second and successive pages are automatically fed so as to produce predetermined copies 20 as shown in FIG. 1B, all the pages inclusive of the first page can be transported and stopped page by page accurately. Moreover, the control device is constructed such that when the output of the CF paper sensor 10 representative of the presence of the CF paper 10 disappears, the page of the CF paper 10 is brought to the predetermined position on the platen 40. This allows even the last page of the CF paper 10 to be copied while being positioned on the platen 40 with accuracy.

In the illustrative embodiment, the pulse generator constituted by the encoder E3 which is associated with the motor M3 and the counter M3TPC for counting the output pulses of the pulse generator are the major components of the control device. Of course, the encoder E3 or similar pulse generator may be replaced with timer means, stated earlier. The encoder E3 may even be replaced with an encoder which is associated with the drive system for driving the belt 62 or the rollers 70, 72 and 74, for example.

As soon as the CF paper 10 on the platen 40 is fully illuminated, the copier 30 sends a discharge command to the ADF 38, as described previously. The motors M2 and M3 start operating in response to the discharge command only and thereby individually drive the belt 62 and discharge unit 69 to transport the CF paper 10.

Stated another way, in the CFF mode the CF paper 10 is not transported despite the arrival of a feed command from the copier 30. This allows the first page of the CF paper 10 to be set on the platen 40 without any trouble. Should the CF paper 10 be transported in response to a feed command as an ordinary document, it would be driven out of the platen 40 before the start of reproduction of the first page resulting in a predetermined copy being not produced.

In the CFF mode, the CF paper 10 may be transported by the feed unit 64 which is adapted to feed an ordinary document. This is undesirable, however, because the feed unit 64 has a separator roller 86 and a separator blade 88 which is held in pressing contact with the roller 86. Specifically, when the CF paper 10 is driven by the separator roller 86 and blade 88, a substantial degree of friction is apt to act on the CF paper 10 to cause to latter skew. While an ordinary document rarely skews despite the friction exerted by the roller 86 and blade 88 because it is relatively short, the CF paper 10 which has a substantial length is apt to undergo a noticeable skew as a result of accumulation of unnoticeable skews.

In the light of the above, the ADF 38 has the CF paper inlet 66 which is independent of the feed unit 64 that serves to feed an ordinary document to the platen 40. Although a transport roller pair or similar transport members for driving the CF paper 10 may be provided between the paper inlet 66 and the platen 40, so long as the first page of the CF paper 10 is set on the platen 40 by hand, the CF paper 10 can be sequentially transported by the belt 62, i.e., without resorting to such extra transport members because the first page will of course be located below the belt 62. For this reason, in the illustrative embodiment, no transport members are provided on the transport path extending between the paper inlet 66 and the platen 40. This positively cuts down the cost of the ADF 38.

Figure 18:
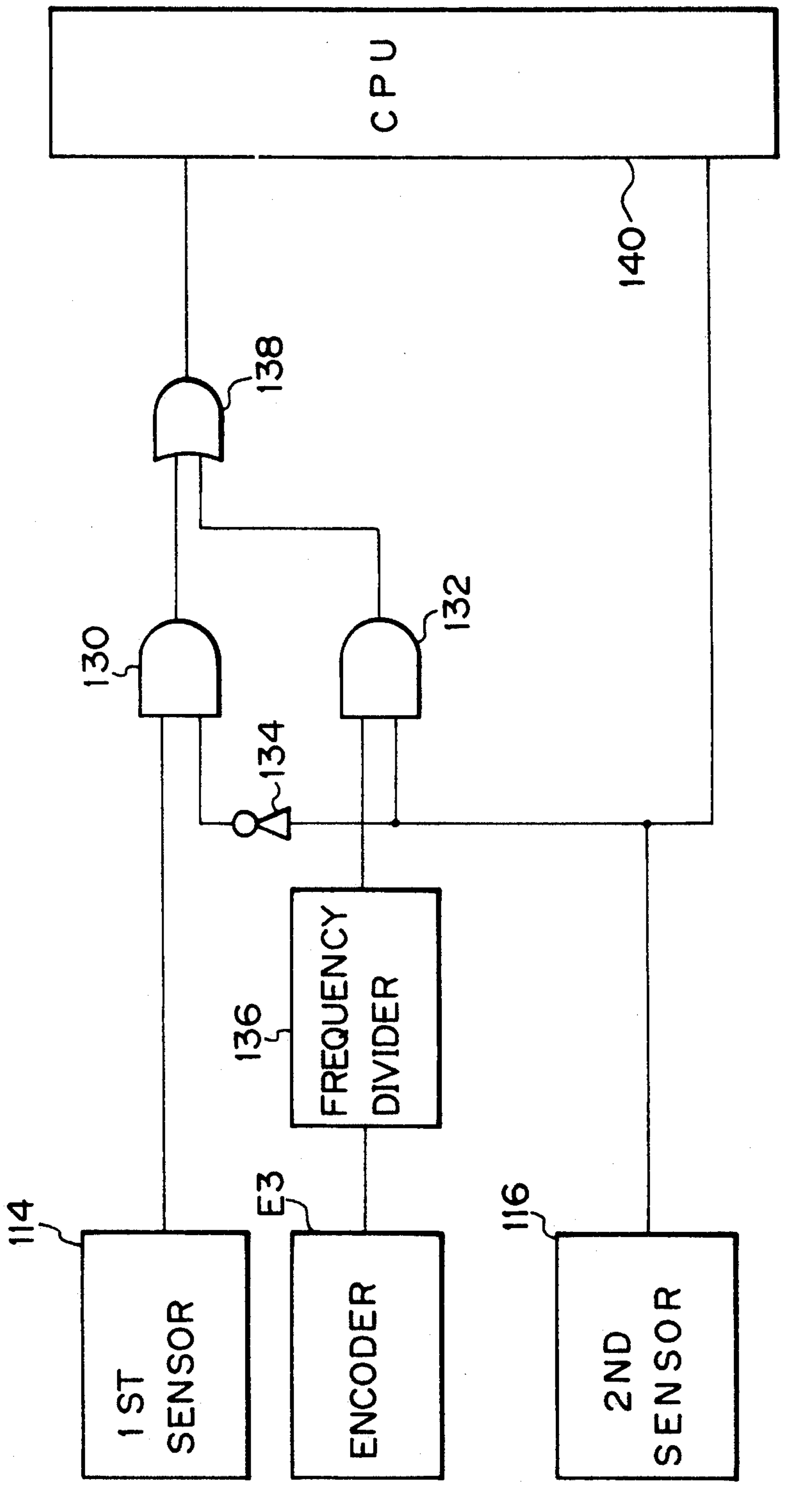
FIG. 18 is a schematic block diagram showing another specific construction of a switching device.

In this particular embodiment, use is made of a CPU for switching the control over the transport and stop of the CP paper 10 from the first sensor 114 to the encoder E3. FIG. 18 shows a specific arrangement for facilitating an understanding of such a switching device. In FIG. 18, before the trailing edge of the last page of the CF paper 10 moves away from the first and second sensors 114 and 116, the output pulses of the sensor 114 responsive to the sprocket holes 24 of the CF paper 10 are fed to a first AND gate 130. On the other hand, while the sensor 116 senses the CF paper 10, its output has a low level and is applied to a second AND gate 132 while being routed through an inverter 134 to the first AND gate 130. Output pulses of the encoder E3 associated with the motor M3 are fed to the second AND gate 132 via a frequency divider 136. The outputs of the AND gates 130 and 132 are coupled to an OR gate 138 the output of which in turn is connected to the CPU 140.

Figure 19:
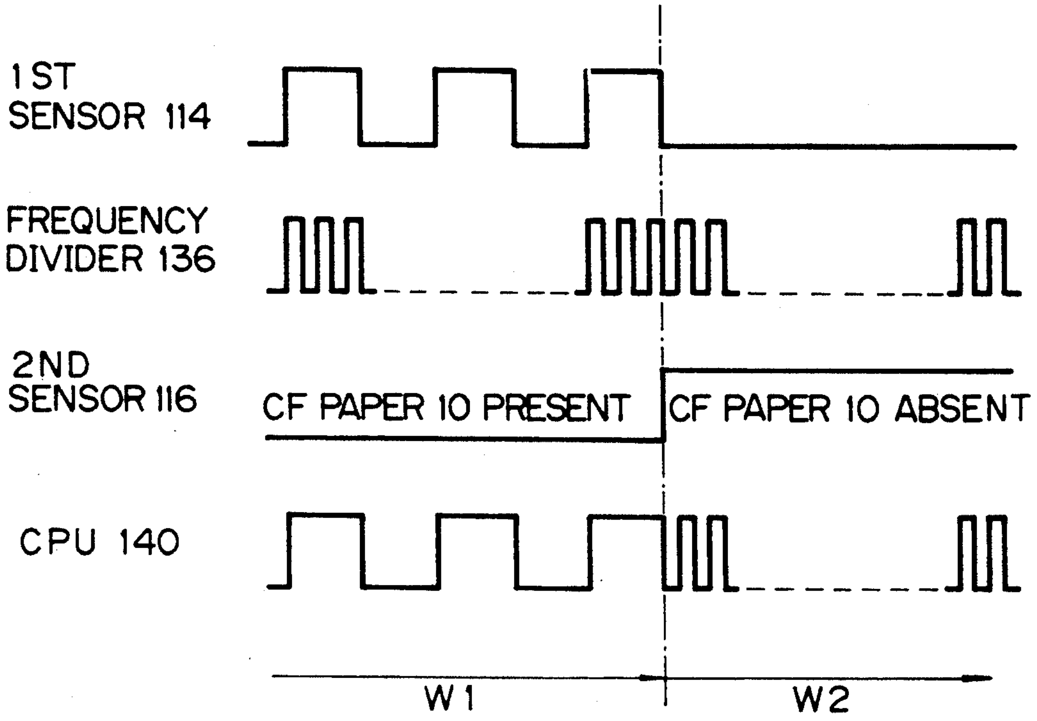
FIG. 19 is a timing chart associated with the circuitry of FIG. 18.

In the above configuration, pulses associated with the output pulses of the first sensor 114 appear on the output of the first AND gate 130 and are fed to the OR gate 138. However, since the inverted low level output of the second sensor 116 is fed to the second AND gate 132, the AND gate 132 does not produce AND. Hence, a pulse signal associated with the outputs of the sensor 114 are fed from the OR gate 138 to the CPU 140 and counted by the latter. This operation is continued over a period of time W1 shown in FIG. 19, whereby the transport and stop of the CF paper 10 is controlled.

As soon as the trailing edge of the last page of the CF paper 10 moves away from the sensors 114 and 116, the sensor 116 does not sense the CF paper 10 any longer and, therefore, its output level becomes high. It follows that the output of the sensor 116 is fed to the AND gate 130 as a low level while being fed to the AND gate 130 as a high level. On the other hand, the output of the sensor 114 is maintained at a low level, and the output of the encoder E3 appearing through the frequency divider 136 is applied to the AND gate 132 as in the previously stated condition. As a result, the AND output of the AND gate 130 disappears, and the outputs of the AND gate 132 associated with the output pulses of the encoder E3 are fed to the OR gate 138. The OR gate 138 produces the same pulses as the output pulses of the frequency divider 136 and delivers them to the CPU 140. Counting the incoming pulses, the CPU 140 controls the transport and stop of the CF paper 10. This operation is performed during a period of time W2 shown in FIG. 19.

As stated above, when the trailing edge of the CF paper 10 moves away from the sensors 114 and 116, the control by the first sensor 114 is automatically handed over to the control by the encoder E3 by the switching device shown in FIG. 18.

Figure 20:
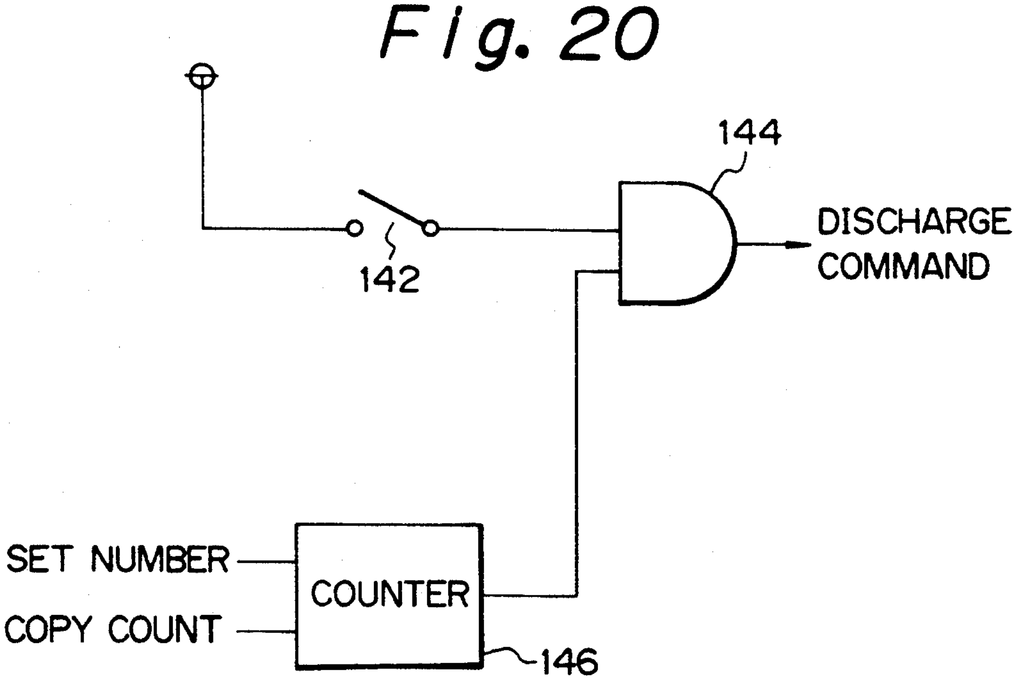
FIG. 20 is a block diagram schematically showing a specific construction of a feed command generating unit.

After the CF paper 10 on the platen 40 has been illuminated, a discharge command is generated to operate the motors M2 and M3 for driving the CF paper 10, as stated earlier. FIG. 20 shows a specific construction of a device for so generating a discharge command. When the first scanner shown in FIG. 3 returns to its home position after fully illuminating a document laid on the platen 40, a home scanner sensor 142 shown in FIG. 20 is turned on and the resulting output is fed to an AND gate 144. While the operator enters a desired number of copies to be produced with a single document, the entered number is set on a counter 146 which is also shown in FIG. 20. As the copying operation is repeated with a certain page of the CF paper 10, the number of times that the operation is repeated is counted by a copy counter so that the counter 146 is sequentially decremented. When the counter 146 is decremented to zero, it feeds an end-of-copy signal to the AND gate 144. At this time, the home sensor 142 delivers its output to the AND gate 144 resulting in a discharge signal being produced from the AND gate 144. In response, the motors M2 and M3 begin to operate and feed the CF page 10 by one page.

While the illustrative embodiment have been shown and described in relation to an electrophotographic copier, it will be apparent that it is similarly applicable to a digital copier, facsimile apparatus or similar image recorder.

The embodiment shown and described achieves various unprecedented advantages as enumerated below.

(1) CF paper can be surely transported and stopped page by page from the first page to the last page thereof only if the first page is positioned on a platen by hand.

(2) When the first page of CF paper is positioned on a platen by hand, the paper is surely prevented from being transported before the first page is copied.

(3) CF paper is free from skews while an ADF is implemented at low cost.

Second Embodiment

A second embodiment of the present invention is generally constructed in the same manner as the ADF 38 shown in FIG. 3, except for the use of two sensors 114*a* and 114*b* in place of the single first sensor 114. The sensors 114*a* and 114*b* are arranged along the row of sprocket holes 24 in the intended direction of paper transport. The ADF is controlled by substantially the same control circuitry as the circuitry shown in FIG. 5.

The illustrative embodiment transports and discharges an ordinary document in the same manner as the first embodiment, and redundant description will be avoided for simplicity. The following description will concentrate on the transport and discharge of CF paper only.

As shown in FIG. 6, whether or not the CFF mode operation should be performed is determined by exactly the same sequence of steps as in the first embodiment. This is followed by CFF pulse check routines (I), (II) and (III) shown in FIGS. 21A, 21B and 21C, respectively.

Figure 21A:
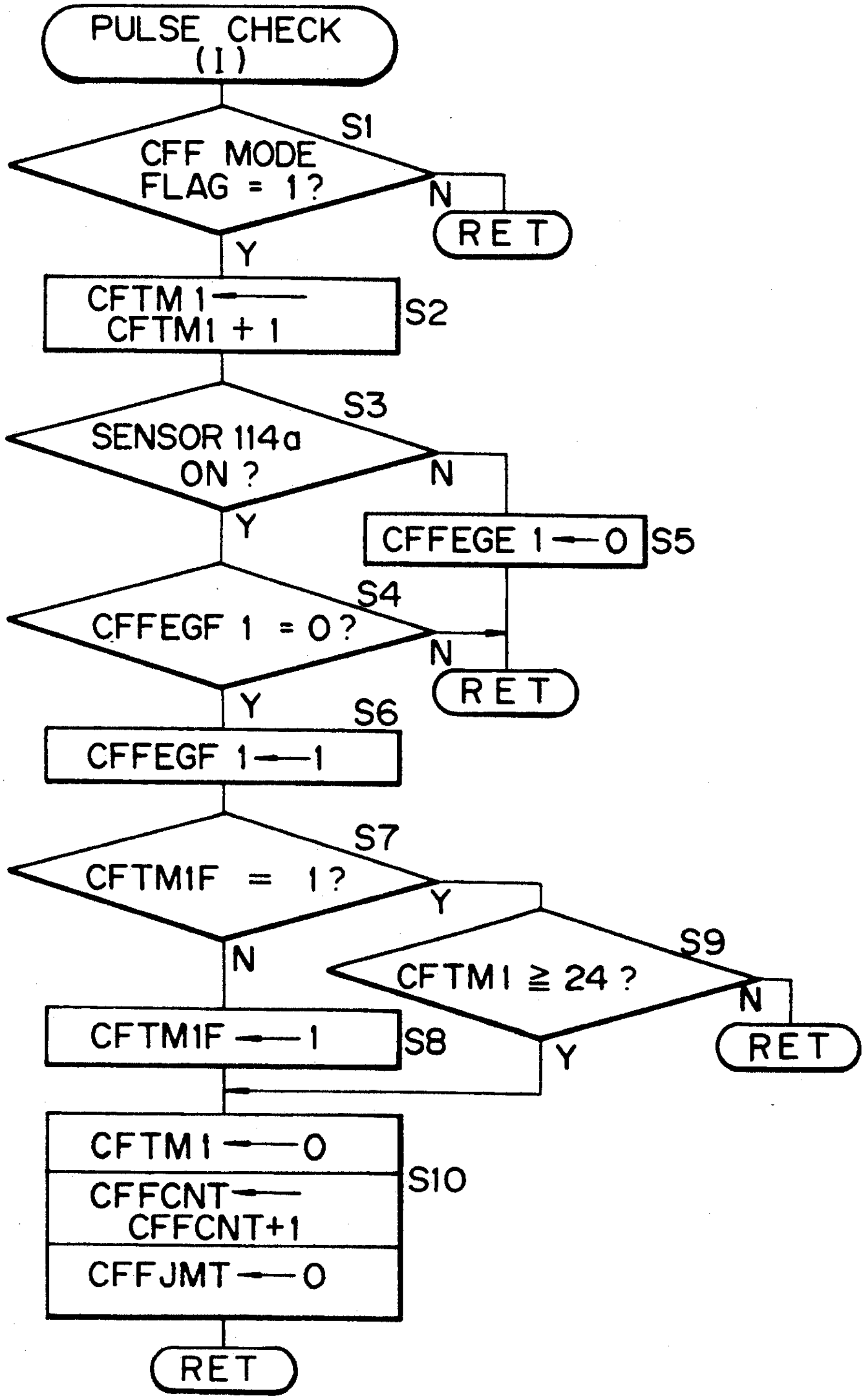
FIGS. 21A through 21C and FIGS. 22 and 23 are flowcharts demonstrating various CFF mode check and CFF pulse check routines and representative of a second embodiment of the present invention.

Briefly, the CFF pulse check routine (I) shown in FIG. 21A detects the sprocket holes 24 of the CF paper 10, causes the counter CFFCNT to count the holes 24, clears the timer CFFJMT adapted to check the jam of the CF paper 10, clears the routine timer CFTM1 which is incremented every millisecond, and performs other various operations. These operations each occur at the edge of a sprocket hole 24 where the state changes from a "no hole" state to a "hole" state. Specifically, in a step S1, whether or not the CFF mode flag has been set to ONE is determined. If the answer of the step S1 is positive (Y), the routine timer CFTM1 is incremented by 1 (one) (S2). Subsequently, whether or not the sensor 114*a* is ON is determined (S3). If the answer of the step S3 is positive (Y), whether or not the flag CFFEGF1 has been reset to ZERO is determined (S4). If the answer of the step S4 is negative (N), CFFEGF1 is reset to ZERO (step S5). If the answer of the step S4 is positive (Y), the flag CFFGF1 is set to ONE (S6) and whether or not the timer CFTM1F is "1" is determined (S7). If the answer of the step S7 is negative (N), the operation advances to a step S8 for incrementing the timer CFTM1F to "1" and then to a step S10. If the answer of the step S7 is positive (Y), that the timer CFTM1 has reached "24" is confirmed (S9), and this is followed by a step S10. Since the timer CFTM1 is incremented every millisecond, the sprocket holes 24 of the CF paper 10 are counted up at the intervals of more than 24 milliseconds, i.e., holes other than the sprocket holes 24 with are spaced apart by the predetermined distance are not sensed. In the step S10, the timer CFTM1 is cleared, the counter CFFCNT is incremented, and the timer CFFJMT is cleared.

Figure 21B:
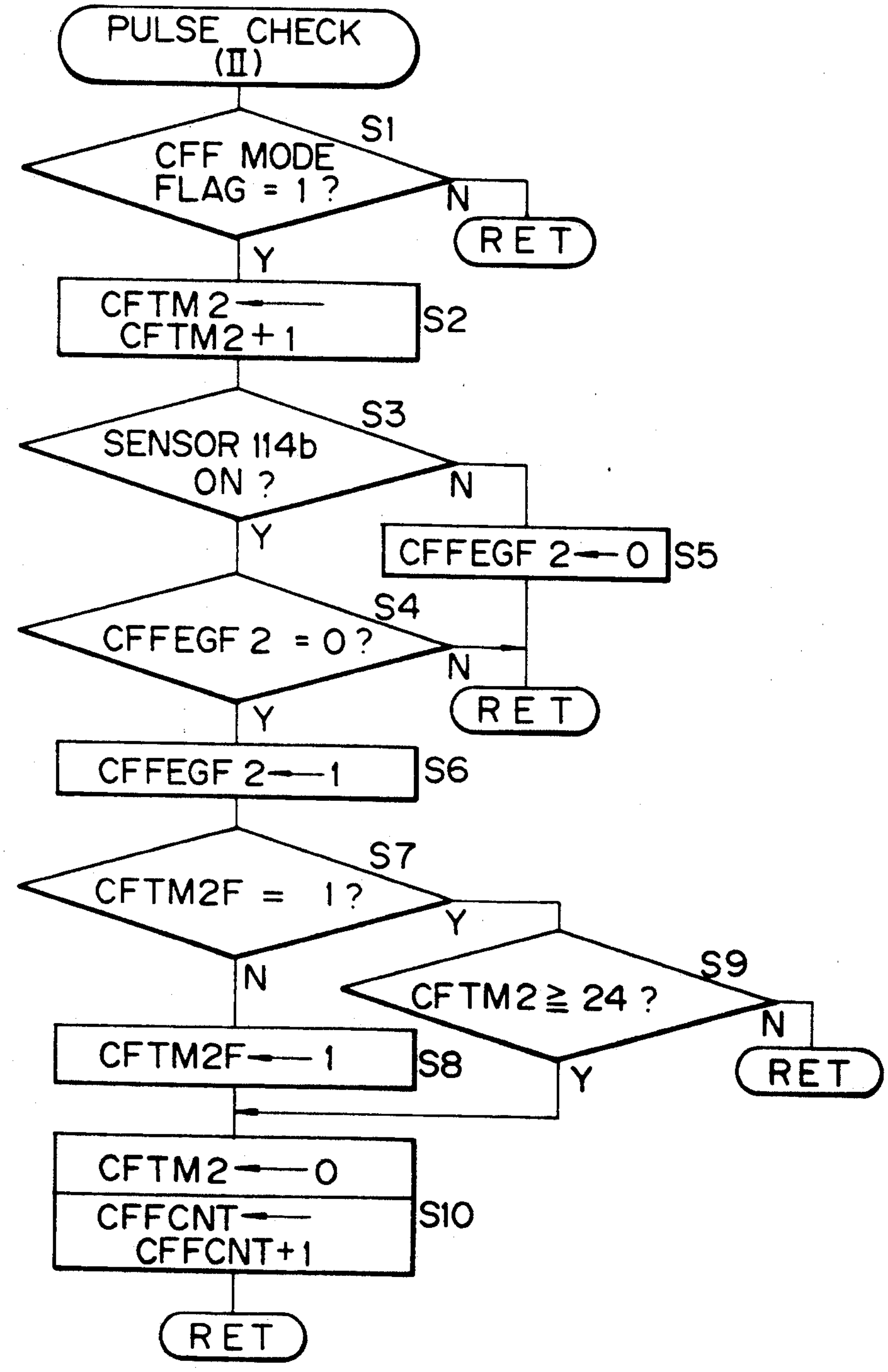

In the CFF pulse check routine (II) shown in FIG. 21B, operations similar to those constituting the CFF pulse check routine (I) are executed with use of the other sensor 114*b*. Specifically, whether or not the CFF mode flag is set to ONE is determined (S1). If the answer of the step S1 is positive (Y), the routine timer CFTM2 is incremented by 1 (S2). Then, the program advances to a step S3 to see if the sensor 114*b* is ON. If the answer of the step S3 is positive (Y), whether or not the flag CFFEGF2 has been reset to ZERO is determined (S4). If the answer of the step S4 is negative (N), CFFEGF2 is reset (step S5). If the answer of the step S4 is positive (Y), the flag CFFEGF2 is set to ONE (step S6) and then whether or not the timer CFTM2F is "1" is determined (S7). If the answer of the step S7 is negative (N), the timer CFTM2F is incremented to "1" (step S8), followed by a step S10. If the answer of the step S7 is positive (Y), whether or not the timer CFTM2 has reached "24" is determined (S9). If the answer of the S9 is positive (Y), the program advances to the step S10. Again, holes other than the holes spaced apart by the predetermined distance are not sensed. In the step S10, the timer CFTM2 is cleared, and the counter CFFCNT is incremented.

Figure 21C:
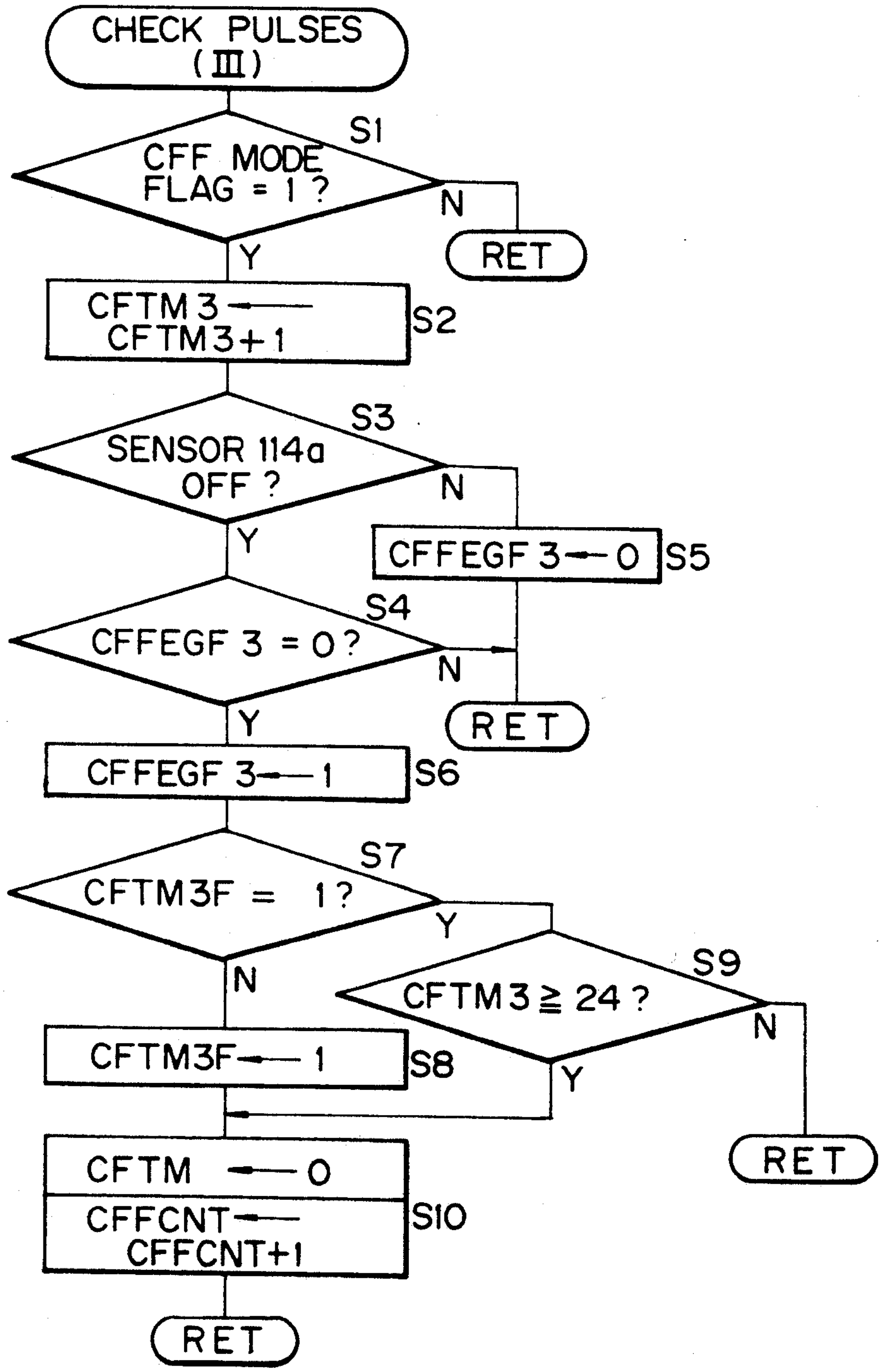

In the CFF pulse check routine (III) shown in FIG. 21C, a procedure similar to the CFF pulse check routine (I) is executed by use of the sensor 114*a*. As shown, whether or not the CFF mode flag has been set to ONE is determined (S1). If the answer of the step S1 is positive (Y), the routine timer CFTM3 is incremented by 1 (S2). Then, whether or not the sensor 114 is OFF is determined (S3). If the answer of the step S3 is positive (Y), whether or not the flag CFFEGF3 has been reset to ZERO is determined (S4). If the answer of the step S3 is negative (N), the flag CFFEGF3 is reset (S5). If the answer of the step S4 is positive (Y), the flag CFFEGF3 is set to ONE (S6) and then whether or not the timer CFTM3F is "1" is determined (S7). If the answer of the step S7 is negative (N), the timer CFTM3F is incremented to "1" (S8), followed by a step S10. If the answer of the step S8 is positive (Y), whether or not the timer CFTM3 has reached "24" is determined (S9). If the answer of the step S9 is positive, the program advances to the step S10. In this manner, the hole sensing operation occurs at the intervals of more than 24 milliseconds, i.e., holes other than regular holes are not sensed. In the step S10, the timer CFTM3 is cleared, and the counter CFFCNT is incremented.

As stated above, in all the CFF pulse check routines (I), (II) and (III), one pulse is counted per sprocket hole 24. It follows that the counter CFFCNT responsive to the pulses is incremented by 3 per hole 24.

As stated previously, the illustrative embodiment uses the timer CFFJMT for jam detection, and this timer is cleared every time a sprocket hole 24 is sensed. When the timer CFFJMT is not cleared even after it has reached a predetermined count, it is determined that a jam has occurred. Generally, the CF paper 10 is transported only by the force of the belt 62 until the first page thereof has been effected by the intermediate transport roller 94 and discharge roller 98, FIG. 3, so that it is apt to slip. Also, slippage of the CF paper 10 is apt to occur more when the CF paper 10 begins to be transported than when it is in transport.

In the light of the above, this embodiment assigns a greater count for jam decision to the condition wherein the CF paper 10 is transported only by the belt 62 than to the condition wherein it is transported by the rollers 94 and 98. Also, a greater count for jam decision is assigned to the condition wherein the CF paper 10 begins to be fed than to the condition wherein it is in transport.

Even when slippage occurs, control is so effected as to bring the CF paper 10 into a halt at a predetermined position. Hence, the slippage is not critical so long as the CF paper 10 comes in time for the imagewise exposure. Rather, selecting a relatively small count for the jam decision would cause simple slippage to be determined to be a jam.

In the illustrative embodiment, therefore, a particular count for jam decision is selected for each of the different conditions on the basis of actually measured data. This is successful in detecting a jam accurately and rapidly while clearly discriminating it from slippage, thereby protecting the CF paper 10 from damage.

In response to a discharge command, the counter CFFJBC is incremented to "1", as stated earlier with reference to FIG. 6. While the CF paper 10 is transported, the set count of the counter DFFJBC is changed to execute a particular operation. In this embodiment, the set count of the counter CFFJBC is also determined in the step S1 of the CFJOB routine, FIG. 8, causing multi-jump to occur on the basis of the determined count.

Figure 22:
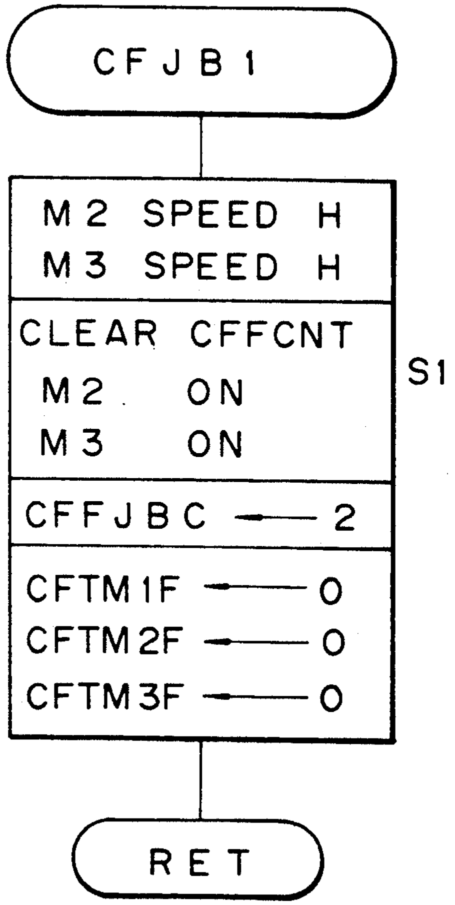

FIG. 22 shows a CFJB1 routine particular to this embodiment. As shown, when the set count of the counter DFFJBC is determined to be "1", a high speed command is fed to motor M2 associated with the belt 62 and the motor M3 associated with the discharge unit, and these motors M2 and M3 are turned to an ON state. At the same time, the counter CFFCNT is cleared. Thereafter, the counter CFFJBC is set to "2" while the flags CFTM1F to CFTM3F are reset to ZERO. These steps are collectively represented by a step S1 in the figure. The flags DVTM1F to CFTM3F are used in the CFF pulse check routines (I) to (III), and each is set on the detection of the first hole 24 to start associated one of the timers CFTM1 to CFTM3.

Figure 23:
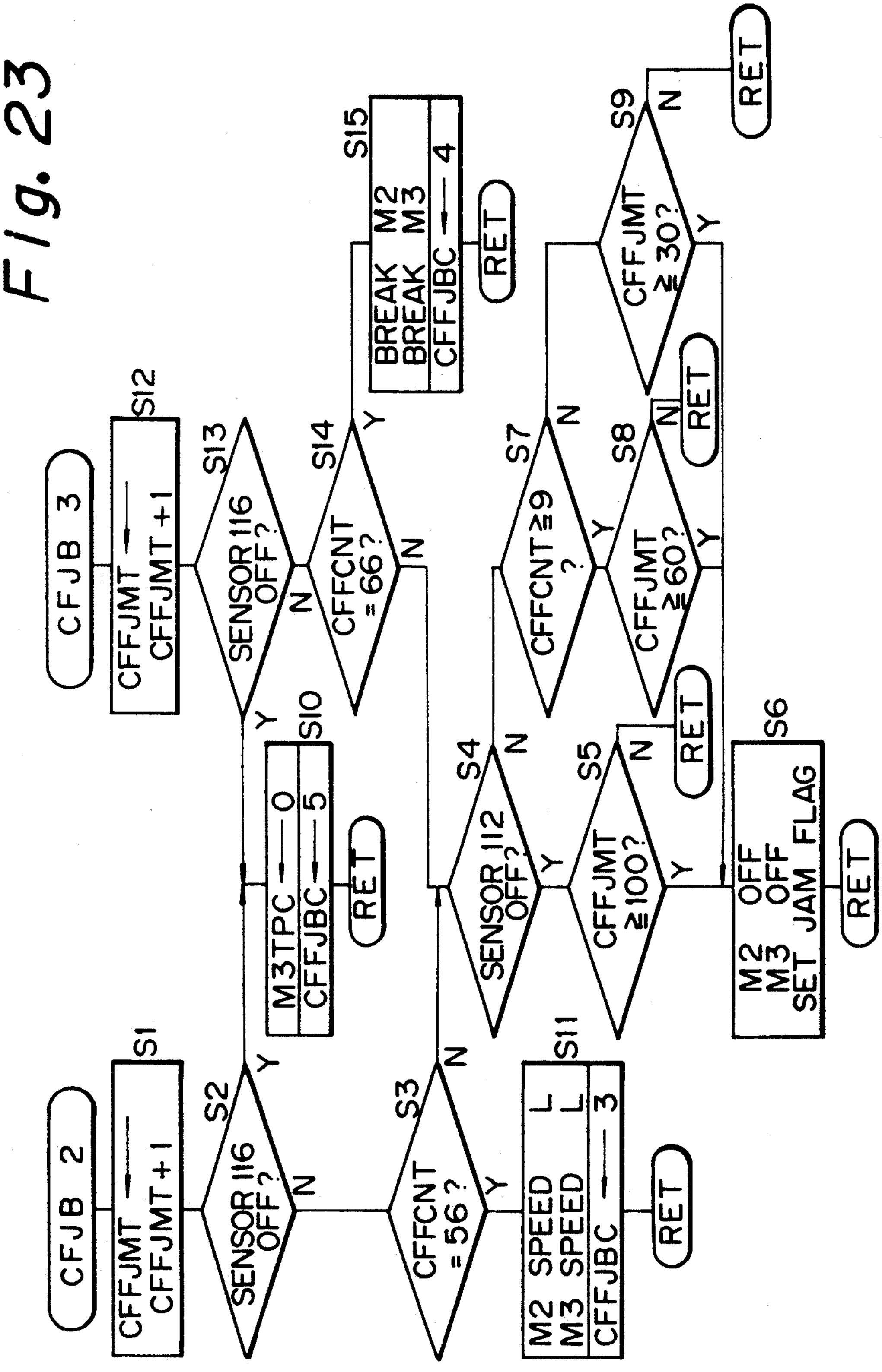

FIG. 23 shows a CFJB2 and a CFJB3 routine particular to the illustrative embodiment. The program enters into the flowchart of FIG. 23 when the set count of the counter CFFJBC is determined to be "2". Specifically, before this routine begins, the counter CFFJMT is incremented (S1). The counter CFFJMT is cleared every time a hole 24 is sensed in the CFF pulse check routine (I) and indicates that a jam has occurred when not cleared even after reaching the predetermined count, as stated earlier. Subsequently, whether or not the second sensor 116 responsive to the CF paper 10 is OFF is determined (S2). If the answer of the sep S2 is negative (N), meaning that the CF paper 10 is present, whether or not the counter CFFCNT has reached "56" is determined (S3). If the answer of the step S3 is negative (N), whether or not the discharge sensor 112 is OFF is determined (S4). If the answer of the step S4 is positive (Y), meaning that the CF paper 10 has not yet been discharged, whether or not the timer CFFJMT has reached "100" is determined (S5). If the answer of the step S5 is positive (Y), the program determines that a jam has occurred and advances to a step S6. In the step S6, the motors M2 and M3 are turned to an OFF state, the JAM flag is set to ONE, and the transport of the CF paper 10 is interrupted. If the answer of the step S4 is negative (N), whether or not the counter CFFCNT is "9" or less is determined (S7). If the answer of the step S7 is positive (Y), whether or not the counter CFFJMT has reached "60" is determined (S8). If the answer of the step S8 is positive (Y), the program determines that a jam has ocurred and advances to the step S6. If the answer of the step S7 is negative (N), whether or not the counter CFFJMT has reached "30" is determined (S9). If the answer of the step S9 is positive (Y), the step S6 is executed.

As described above, in this embodiment, a different count for jam decision is assigned to the counter CFFJMT for each of the condition wherein the discharge sensor 112 is OFF with the CF paper 10 being transported only by the belt 62 and the condition wherein the discharge sensor 112 is ON with the CF paper 10 being transported by the rollers 94 and 98. Such different counts prevent simple slippage from being determined to be a jam. Further, a different count for jam decision is assigned to the counter CFFJMT for each of the condition wherein the CF paper 10 begins to be transported and the condition wherein it is transported by the rollers 94 and 98. This prevents slippage apt to occur at the beginning of transport from being determined to be a jam.

Referring again to FIG. 23, if the answer of the step S2 is positive (Y), M3TPC is cleared while CFFJBC is set to "5" (S10). If the answer of the step S3 is positive (Y), meaning that CFFCNT has reached "56" without a jam having occurred, the motors M2 and M3 are individually set to a low speed to enhance accurate stop of the CF paper 10 while CFFJBC is set to "3" (S11).

When the CFFJBC is set to "3", the operation is transferred to a step S12 so that CFFJMT is incremented before the beginning of the routine. In the next step S13, whether or not the sensor 116 responsive to the CF paper is OFF is determined. If the answer of the step S13 is positive (Y), the step S10 is executed. If the answer of the step S13 is negative (N), whether or not CCFCNT has reached "66" is determined (S14). If the answer of the step 14 is positive (Y), the motors M2 and M3 are braked and CFFJBC is loaded with "4" (S15). If the answer of the step S14 is negative (N), the operation is transferred to the step S4. This is followed by the sequence of steps previously described in relation to the CFJB2 routine.

It is to be noted that the routines CFJB4 to CFJB7 of this embodiment are identical with those previously stated with reference to FIGS. 13 through 16.

As described above, this embodiment assigns a greater count for jam decision to the condition wherein the CF paper 10 is transported only by the belt 62 than to the condition wherein it is transported by the rollers 94 and 98, and a greater count to the condition wherein the CF paper 10 begins to be fed than to the condition wherein it is in stable transport. This successfully prevents slippage from being determined to be a jam. Hence, this embodiment detects a jam of the CF paper 10 accurately without any malfunction and then brings it to a halt, whereby the CF paper 10 is freed from damage and efficiently transported. Furthermore, by selecting an optimum count for jam decision in matching relation to the characteristics of the CF paper 10, it is possible to detect a jam within the shortest period of time available with the CF paper.

Third Embodiment

A third embodiment which will be described is capable of transporting and discharging CF paper with a carbon. In this embodiment, the sensors 114*a* and 114*b* each is inhibited from sensing a hole in CF paper with a carbon over a predetermined period of time after it has sensed a sprocket hole. This embodiment is essentially the same in general construction and control circuitry as those shown in FIGS. 3 and 5, and redundant description will be avoided for simplicity.

Figure 24:
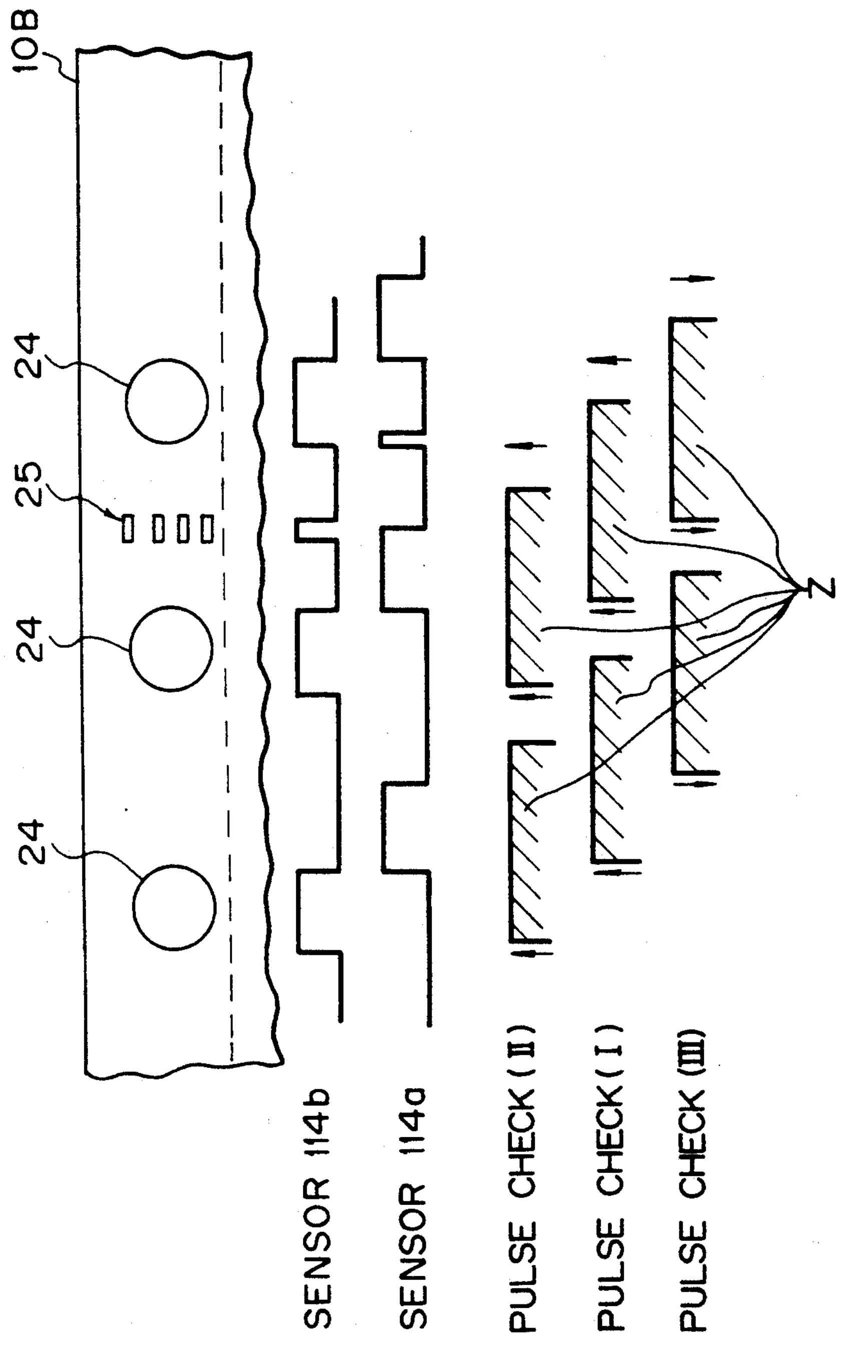
FIG. 24 is a chart showing how a third embodiment of the present invention senses the sprocket holes of CF paper with a carbon.

FIG. 24 shows CF paper with a carbon 10B which is transported and discharged by this particular embodiment. As shown, the CF paper 10B has a number of sprocket holes 24 and some cuts 25 intervening between nearby sprocket holes 24. The cuts 25 are adapted to fasten the CF paper 10B and the carbon temporarily to each other. When this embodiment transports the CF paper with a carbon 10B, in CFF pulse check routines (I), (II) and (III) shown in FIGS. 21A through 21C, the sensors 114*a* and 114*b* each is inhibited from sensing a hole over a predetermined period of time after having sensed a single sprocket hole 24, as represented by inhibition ranges Z in FIG. 24. Hence, the sensors 114*a* and 114*b* do not sense the fastening cuts 25 at all.

As stated above, this embodiment prevents the fastening cuts 25 formed through the CF paper 10B with a carbon 10B from being determined to be the sprocket holes 24 which are also formed through the CF paper 10B. This insures error-free transport of the CF paper 10B.

Fourth Embodiment

Figure 25:
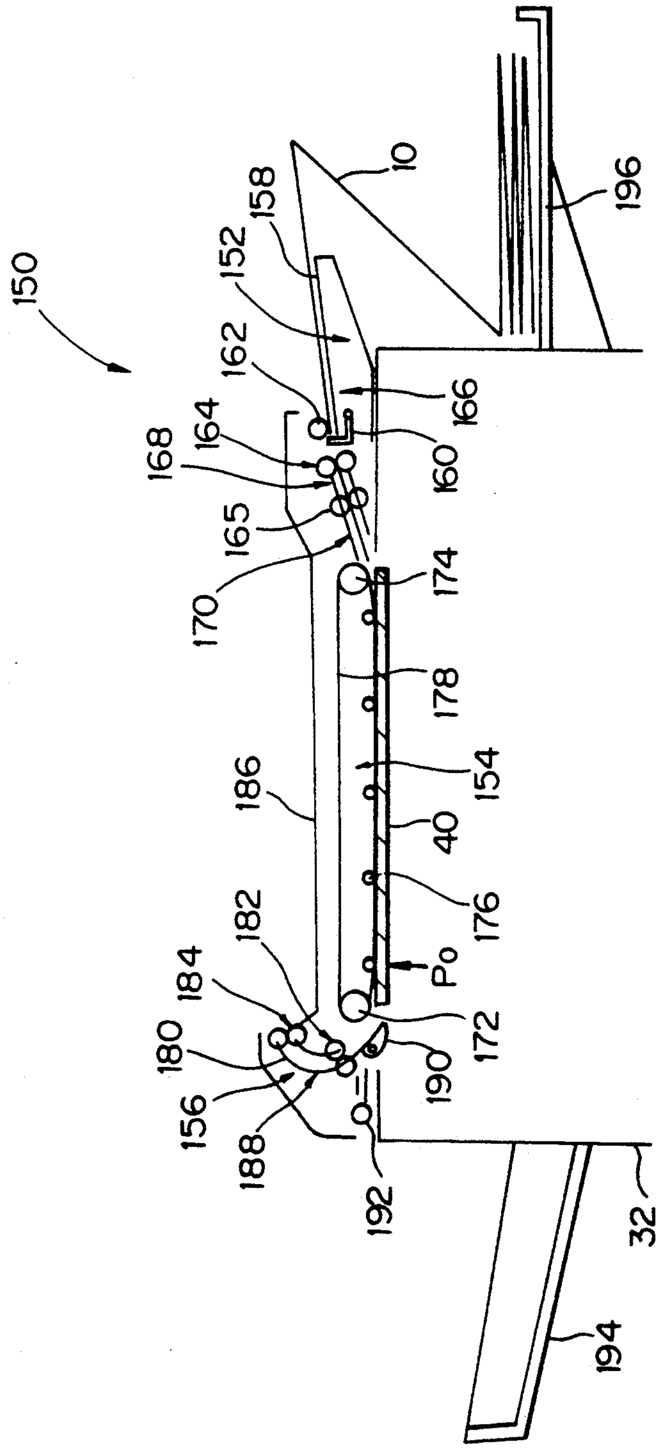
FIG. 25 is a section showing a fourth embodiment of the present invention.

Referring to FIG. 25, a fourth embodiment of the present invention is shown. As shown, an ADF, generally 150, is mounted on the top of the copier body 32 in such a manner as to openably cover the glass platen 40 and is generally made up of a separation and feed unit 152, a transport unit 154, and a discharge unit 156. The separation and feed unit 152 has a document table 158 on which a stack of documents may be loaded face down, an inlet pawl 158 for truing up the leading edges of the documents while regulating the feed of the documents, a pick-up roller 162 movable into and out of contact with the uppermost document of the stack for facilitating the feed of that document, a separation and feed roller pair 164, and a pull-out roller pair 165. A document set sensor 166 senses documents which may be stacked on the document table 158. A lead edge sensor 168 senses the leading edge of a document which has moved away from the separation and feed roller pair 164. A register sensor 170 is disposed between the pull-out roller pair 165 and the transport unit 154. The transport unit 154 is mainly constituted by a belt 178 which is passed over a drive roller 172 and a driven roller 174 and pressed against the glass platen 40 by a plurality of presser rollers 176. The belt 178 has a size large enough to cover the entire glass platen 40.

When a document transported to the glass platen 40 and illuminated thereon is to be driven out of the glass platen 40 by the transport unit 154, the discharge unit 156 receives the document from the transport roller pair 182 by way of a turn guide 180 and causes a discharge roller pair 184 thereof to discharge the document to a first tray 186 which is situated above the belt 178. Such a discharging operation is sensed by a discharge sensor 188. Since the illustrative embodiment is designed to handle CF paper as well as ordinary documents, it has a straightforward discharge path in addition to the turn discharge path. Specifically, a selector pawl 190 for selecting a particular discharge path is provided while a discharge roller 192 is located on a straight discharge path which extends out from the glass platen 40. A second tray 194 is mounted on the discharge side of the copier body 32 in association with the discharge roller 192. A second feed table 196 is mounted on the copier body 32 below the document table 158 of the separation and feed unit 152, so that the CF paper 10 may be laid thereon in a folded position.

Figure 26:
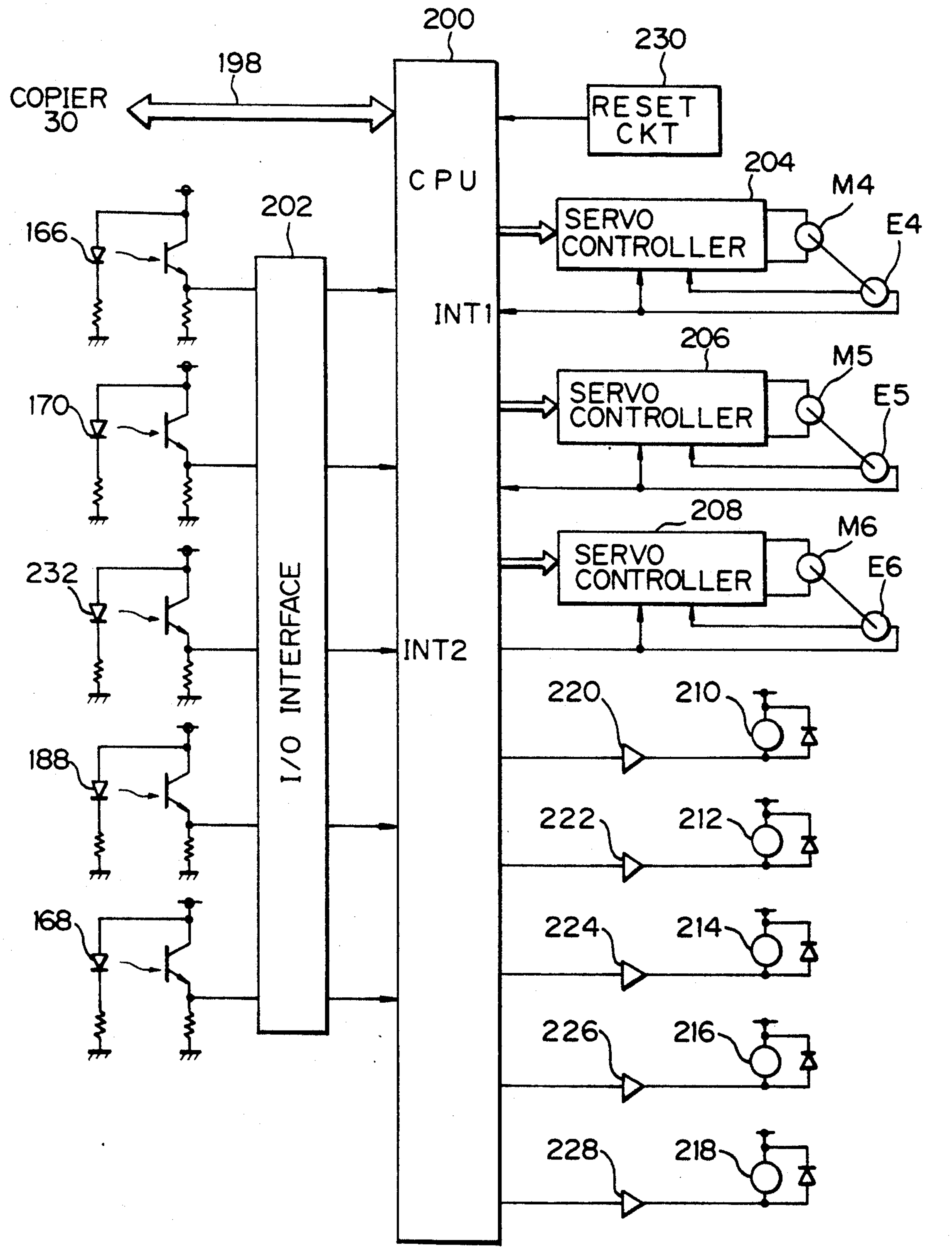
FIG. 26 is a schematic block diagram of a control system which is associated with the ADF of FIG. 25.

FIG. 26 indicates a control system associated with the ADF 150 having the above construction. The ADF control system is interconnected to a control system installed in the copier 30 by a serial interface 198 and is mainly constituted by a CPU 200 which also serves as a CF paper transport control unit. Each of the sensors 166, 168, 170 and 188 is implemented by a light emitting element and a phototransistor for sensing a document. Output signals of these sensors are fed to the CPU 200 via an input/output (I/O) interface 202. The separation and feed unit 152 is driven by a motor M4 which is provided with an encoder E4. The motor M4 is controllably driven by the CPU 200 via a servo controller 204. Likewise, motors M5 and M6 associated with the drive roller 172 of the transport unit 152 and the discharge unit 156, respectively, are provided with encoders E5 and E6, respectively. The motors M5 and M6 are also controllably driven by the CPU 200 via servo controllers 206 and 208, respectively. The encoder E4 associated with the motor M4 is connected to an interrupt terminal INT1 of the CPU 200. A solenoid 210 releases the stop pawl 160, a solenoid 212 moves the roller 162 up and down, a solenoid 214 releases the separator, a solenoid 216 is associated with a feed clutch, and a solenoid 218 is associated with the selector pawl 190. The solenoids 210, 212, 214, 216 and 218 are controllably driven by the CPU 200 via drivers 220, 222, 224, 226 and 228, respectively. The reference numeral 230 designates a reset circuit.

Assume that the ADF 150 constructed as described above is operated with ordinary documents as distinguished from CF paper. The ordinary documents are stacked on the document table 158 with their leading edges abutting against the stop pawl 160. The separation and feed unit 152 separates the uppermost document from the stack and feeds it toward the glass platen 40. Then, the belt 178 drives the document on and along the glass platen 40 to a predetermined reference position $P_0$ (FIG. 21). After the register sensor 170 has sensed the leading edge of the document being transported, the movement of the belt 178 is stopped at a predetermined timing or when the encoder E5 associated with the motor M5 produces a predetermined number of pulses, whereby the document is brought to a stop with its leading edge being located at the reference position $P_0$. In this condition, optics accommodated in the copier body 32 illuminates the document on the glass platen 40, and then a sequence of image forming steps including a step of forming a latent image are executed to produce a copy. On completion of the illumination, the belt 178 is driven again so that the next document is fed and positioned on the glass platen 40. The preceding document is driven out onto the first tray 186 by the discharge unit 156. The procedure described so far is repeated with all of the documents.

The ADF 150 is capable of automatically transporting the CF paper 10, 10A shown in FIGS. 1A and 1C by using the sprocket holes 24 which are formed through the CF paper 10. Specifically, as shown in FIG. 25, the ADF 150 has a sprocket hole sensor 232 which is disposed between the pull-out roller pair 165 and the belt 178 independently of the register sensor 170. Implemented as a photosensor, the sprocket hole sensor 232 is located on an imaginary line along which the sprocket holes 24 of the CF paper 10 are transported, so that the sensor 232 produces a pulse every time it senses a sprocket hole 24. The output of the sprocket hole sensor 232, like the outputs of the other sensors 166, 168, 170 and 188, are coupled to the CPU 200 via the I/O interface 202. Specifically, the output of the sensor 232 is interconnected to an interrupt terminal INT2 of the CPU 200.

Figure 27A:
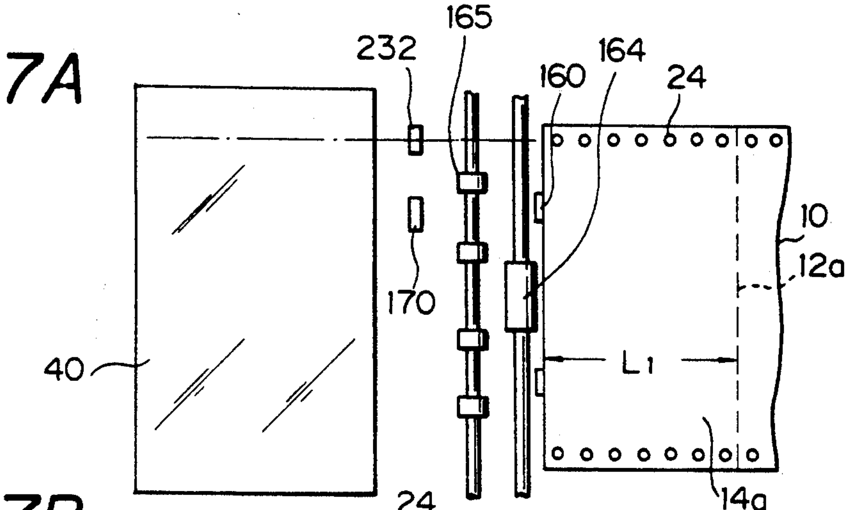
FIGS. 27A through 27C are views useful for understanding the manner of CF paper transport.
Figure 27B:
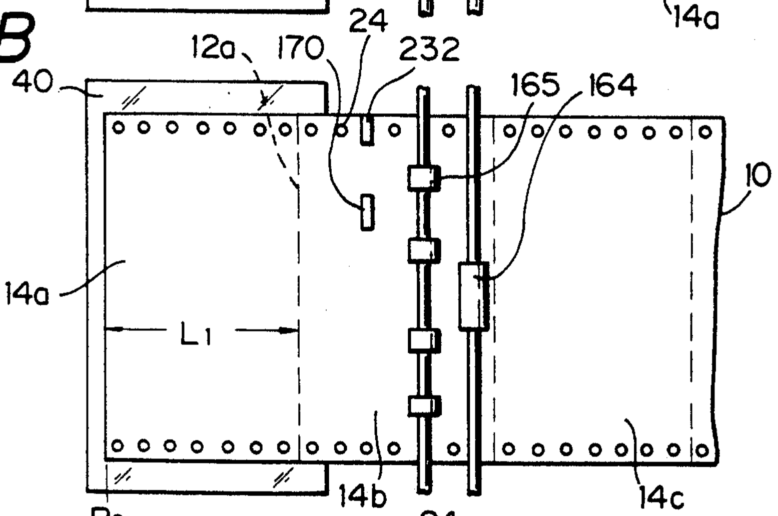

The ADF 150 is operable with the CF paper 10 for producing a copy, as follows. The CF paper 10 is laid on the second document table 196, and then its leading edge is positioned on the document table 158 by hand such that it abuts against the stop pawl 160 like that of an ordinary document (see FIG. 27A). After the start of document feed, as the register sensor 170 senses the leading edge of the CF paper 10, the belt 178 is brought to a stop after being driven by a predetermined amount as with an ordinary document. This causes the leading edge of the CF paper 10 to be stopped at the reference position $P_0$. As a result, the first page 14*a* of the CF paper 10 is located in the predetermined position on the glass platen 40 to be illuminated (see Fig. 27B). In this condition, the first page 14*a* having a unit size $L_1$ is ready to copy. At this instant, the sprocket hole sensor 232 has sensed the "n" sprocket hole of the next page 14*b* of the CF paper 10.

Figure 27C:
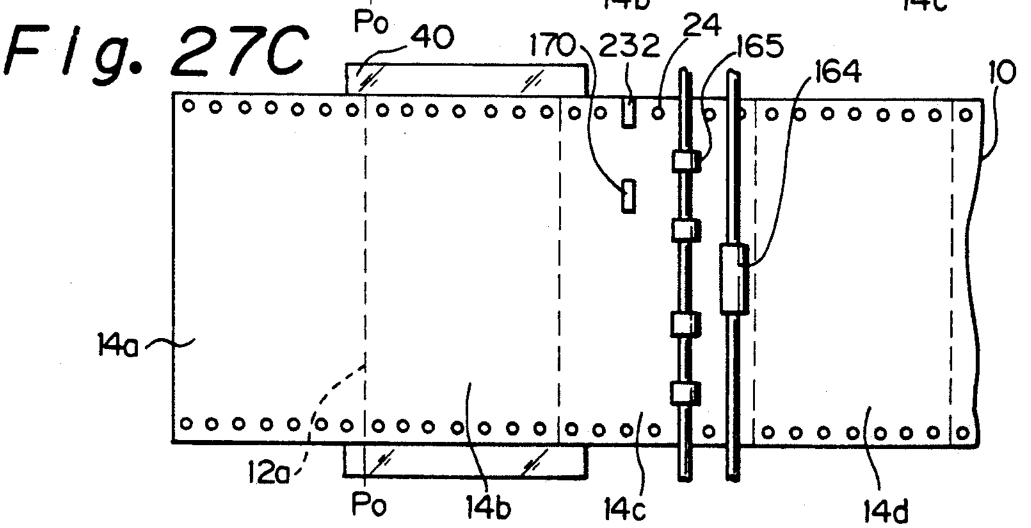

As soon as the first page 14*a* of the CF paper 10 has been illuminated, the belt 178 is driven while the sprocket holes 24 of the CF paper 10 being transported are sensed by the sensor 232. When the count of the sprocket holes 24 reaches a predetermined value as counted by the CPU 200, the movement of the belt 178 is stopped. Since the sprocket holes 24 of the CF paper 10 have a constant pitch and since the amount of feed of the paper 10 is controlled on the basis of the number of sprocket holes 24 (associated with one page), the next page 14*b* is successfully brought to the predetermined position on the glass platen 40 to be illuminated, as shown in FIG. 27C. The transport and stop of the CF paper 10 will be controlled on the basis of the number of senses sprocket holes 24 for the second page 14*b* and successive pages also. By the above procedure, the consecutive pages 14*a*, 14*b*, 14*c*, . . . of the CF paper 10 may be copied one after another. It is to be noted that the control over the transport and stop of the CF paper 10 is not available with the register sensor 170 as to the second page 14*b* and successive pages, i.e., it is implemented by the sprocket hole sensor 232.

The ADF 150 is capable of controlling the transport of CF paper 10 even when the paper 10 is driven in the reverse direction. While this kind of control will be needless in an ordinary situation, it will advantageously implement jam recovery when a paper sheet carrying a transferred image thereon jams the copier due to misfeed or similar cause.

Specifically, assume that an ADF allows CF paper to be copied by transporting and stopping it automatically, and that a paper sheet on which a certain page of the CF paper has been transferred jams a copier while the CF paper is transported to locate the next page in a predetermined illuminating position on a glass platen. Then, the particular page associated with the jamming paper sheet has to be copied again by opening the ADF and then locating that page again on the glass platen by troublesome manipulations. In the illustrative embodiment, the CPU 200 continuosly monitors the transport of the CF paper 10 in terms of the number of sprocket holes 24 which are sensed by the sprocket hole sensor 232. Hence, when a paper sheet being transported jams the copier while the CF paper 10 is driven again, the page of the CF paper 10 associated with the jamming paper sheet can be automatically located again in the illuminating position by reversing the movement of the belt 178, i.e., pulling back the CF paper 10 by the same amount as the transported amount. The operator, therefore, needs only to remove the jamming paper sheet and then press the print button of the copier and is thereby freed from extra manipulations associated with the CF paper 10.

Reference will be made to FIGS. 28 to 37B for describing the control operations of the ADF 150 more specifically.

Figure 28:
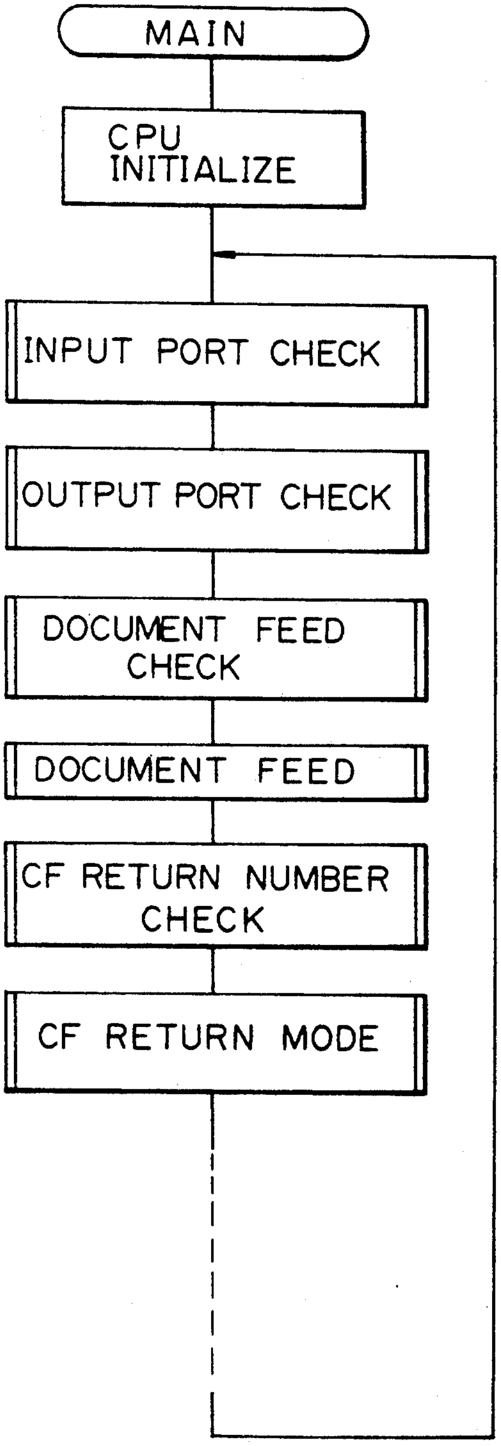
FIGS. 28 to 37B are flowcharts demonstrating specific operations of the ADF shown in FIG. 25.

FIG. 28 shows a main flow which begins with a "CPU initialize" routine. This routine may be such that various ports of the CPU 200 are individually conditioned to serve as input ports and output ports. Then, the input ports are checked, i.e., the various sensors 166, 168, 170, 188 and 232 connected to the I/O interface 202 as shown in FIG. 26 are checked as to their sensing states. This is followed by an "output port out" routine for producing signals which are individually representative of whether the ports connected to the motors M4, M5 and M6 and solenoids 210, 212, 214, 216 and 218 are connected are ON or OFF. For example, it is not that when the motor M4 is turned on in another subroutine, an ON signal is generated in that subroutine, but that ON/OFF signals associated with all of the loads are generated by the "output port out" subroutine.

Figure 29:
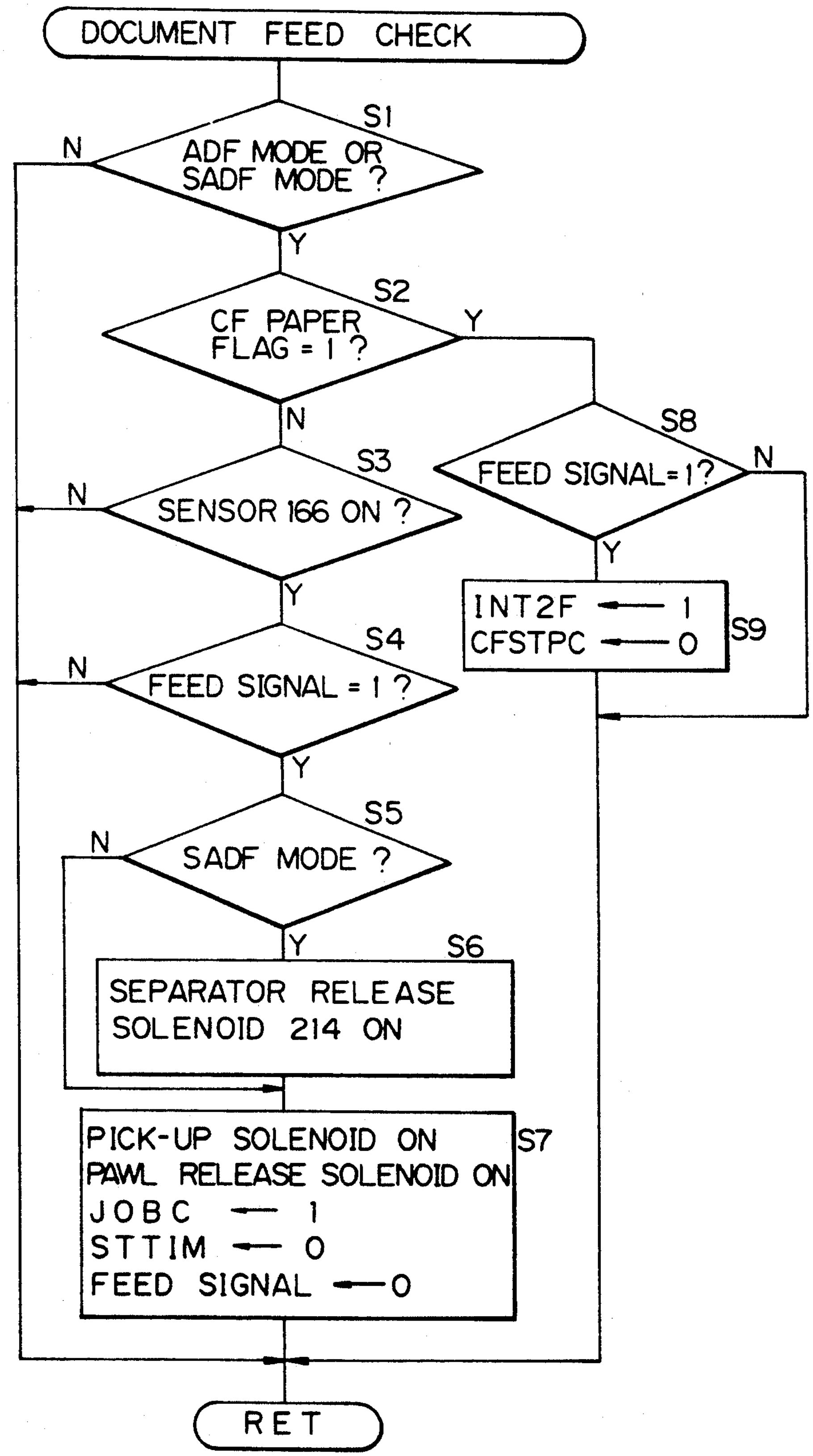

This is followed by a "document feed check" routine. In this routine, whether or not documents are laid on the document table 158 of the ADF 150 is determined via the document set sensor 166, whether or not a document feed signal from the copier 30 has arrived is determined, and whether or not to feed a document is determined. Details of this subroutine are shown in FIG. 29. ADF transport occurs in an ADF mode or an SADF (semiautomatic document feed) mode. In FIG. 25, the subroutine begins with determining whether or not any of such modes is selected (S1). If the answer of the step S1 is YES, whether or not the document is the CF paper 10 is determined (S2). The decision as to whether or not the document is the CF paper 10 itself is executed by another subroutine and, if use is made of the CF paper 10, a CF paper flag is set to a (logical) ONE. Assuming that the document is not the CF paper 10 (i.e. the CF paper flag is in a (logical) ZERO), the document set sensor 166 is turned on to see if sheet documents are laid on the document table 158 (S3). If such documents are present on the table 158, the program waits for a feed signal from the copier 30 (S4) and then enters into an actual document feeding operation. The separator release solenoid 214 is turned on (S6) in the SADF mode (S5) and is not turned on in the ADF mode. Further, the pick-up solenoid 212 and pawl release solenoid 210 are turned on, a job counter JOBC assigned to document feed processing is incremented to "1", a timer STTIM is reset to "0", and a document feed signal is set to a ZERO (S7). On the other hand, when the document is the CF paper 10 (S2), after a feed signal has appeared (S8), a flag INT2 is turned from a ZERO to a ONE while a stop counter CFSTPC is reset to "0" (S9).

Figure 30:
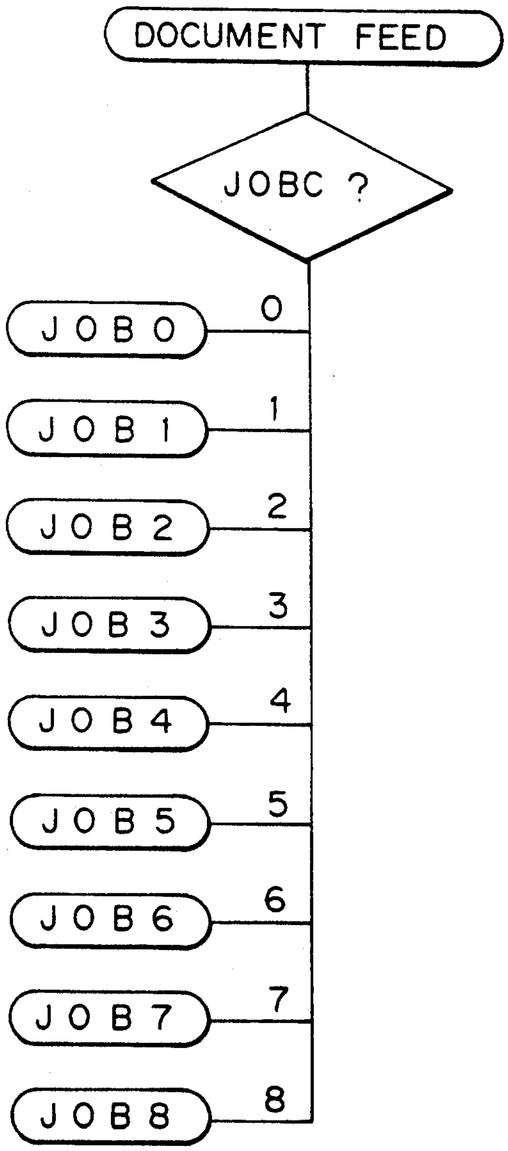

The document feed check processing described above is followed by actual document feed processing which begins at the instant when a document is fed from the document table 158 and ends at the instant when the document moves away from the register sensor 170. As shown in FIG. 30, this subroutine is executed on the basis of the count of the job counter JOBC. FIGS. 31A to 31I indicate what occurs with the change in the count of the counter JOBC. In the figures, STTIM indicates a timer while x1 to x7 to be compared with the timer are each rerpresentative of a specific predetermined value. For example, in a job 2 shown in FIG. 31C, the decision as the the timer STTIM with respect to x2 means to see if the lead edge sensor 168 has been turned on at a predetermined timing. When the sensor 168 is not turned on on the lapse of x2, the program determines that the document being fed has jammed the transport path and, then, turns the jam flag from a ZERO to a ONE. In this manner, x1 to x7 are representative of certain predetermined values which are used to see if the document feeding operation is proceeding at predetermined timings and for other various purposes.

Figure 31A:
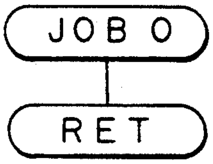
Figure 31B:
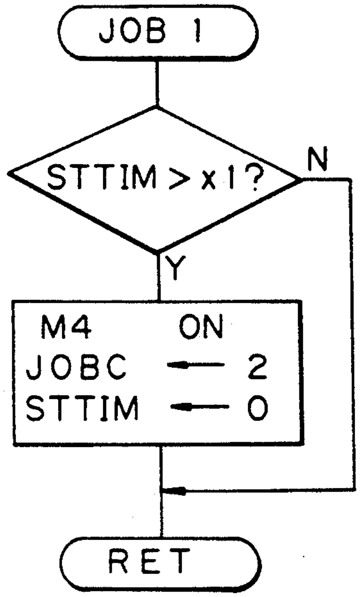
Figure 31C:
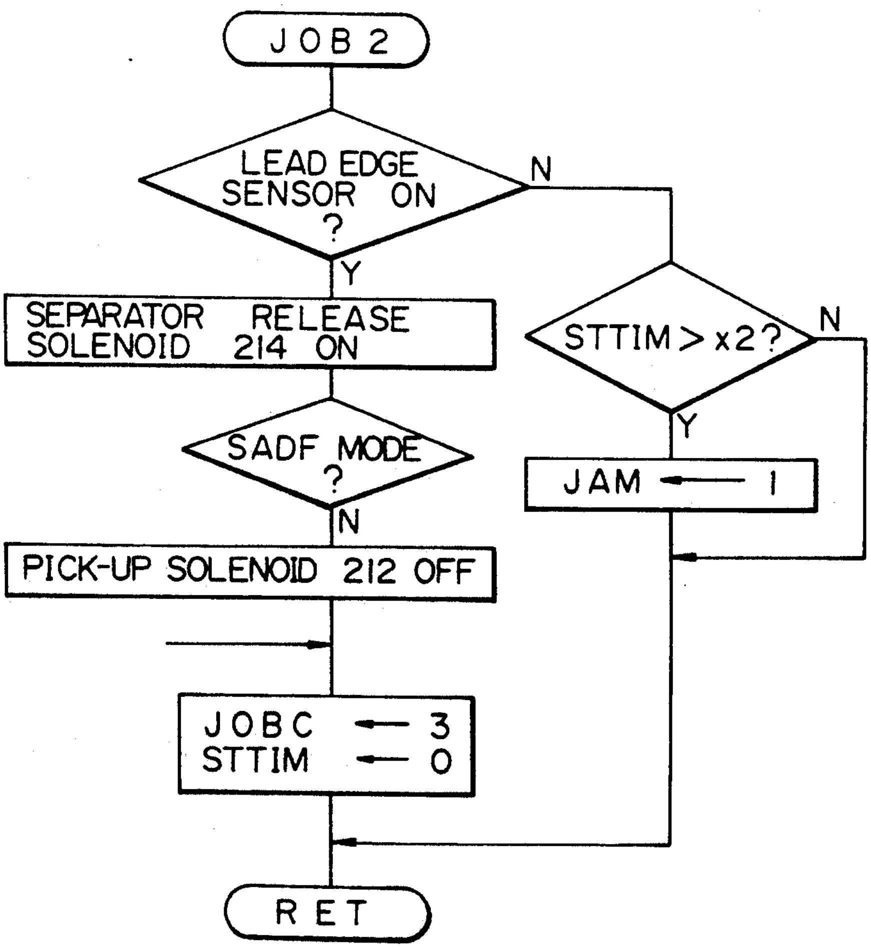
Figure 31D:
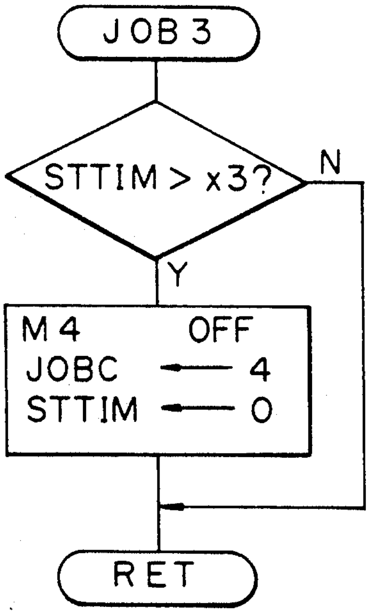
Figure 31E:
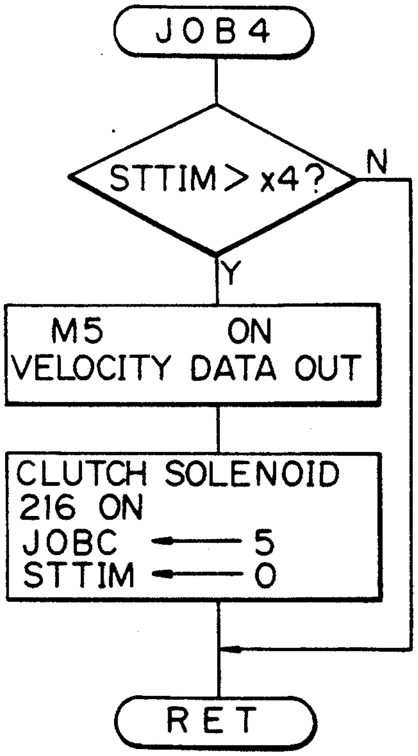
Figure 31F:
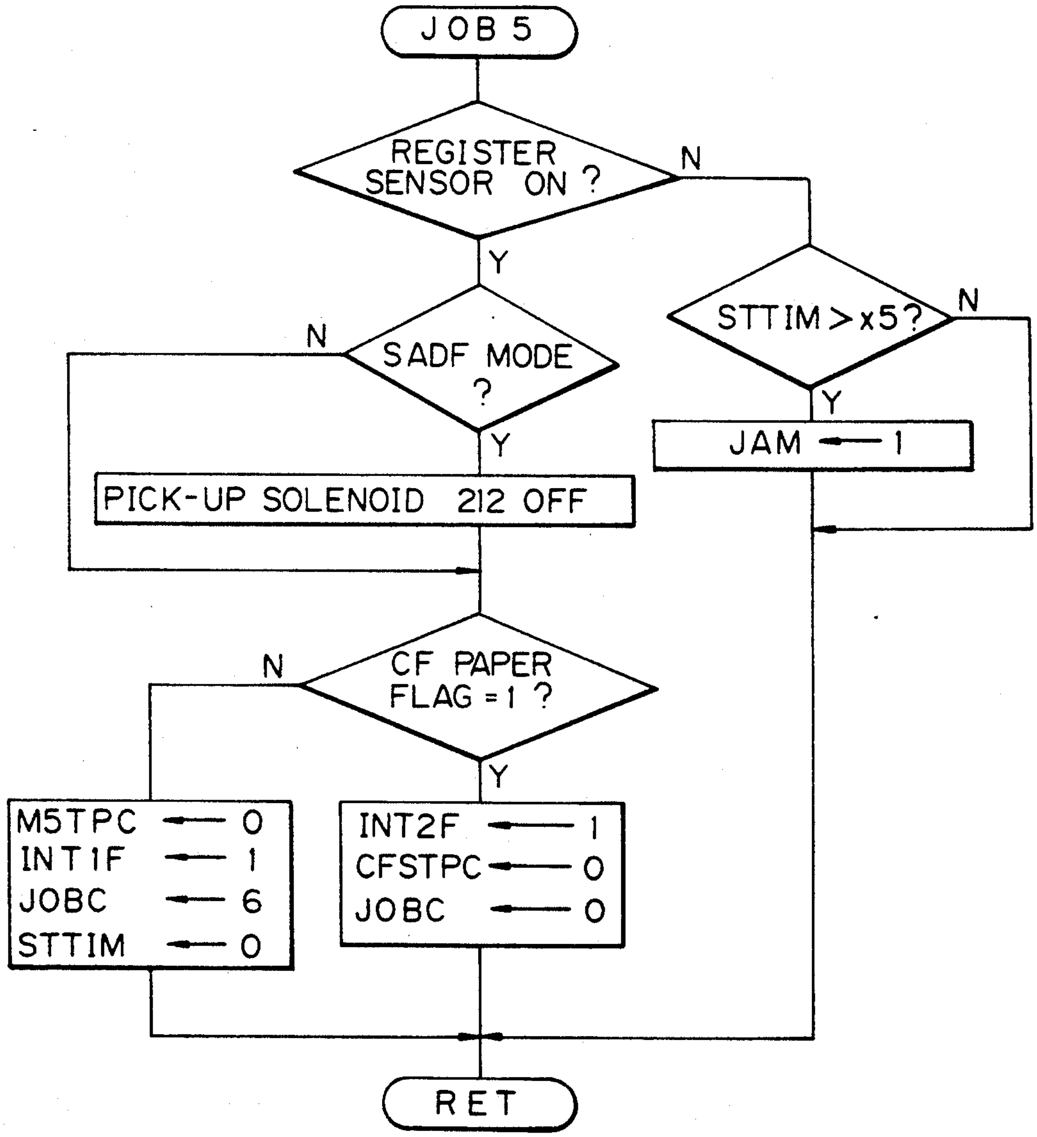
Figure 31G:
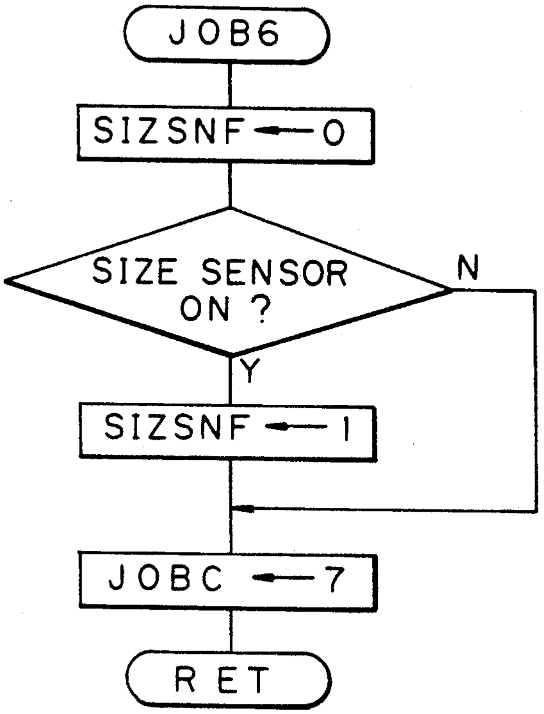
Figure 31H:
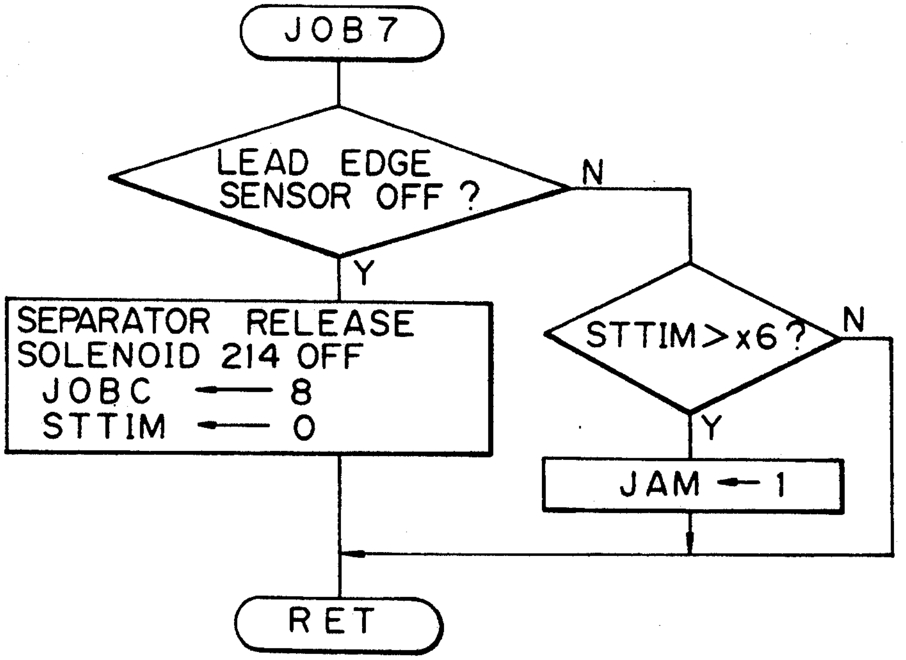
Figure 31I:
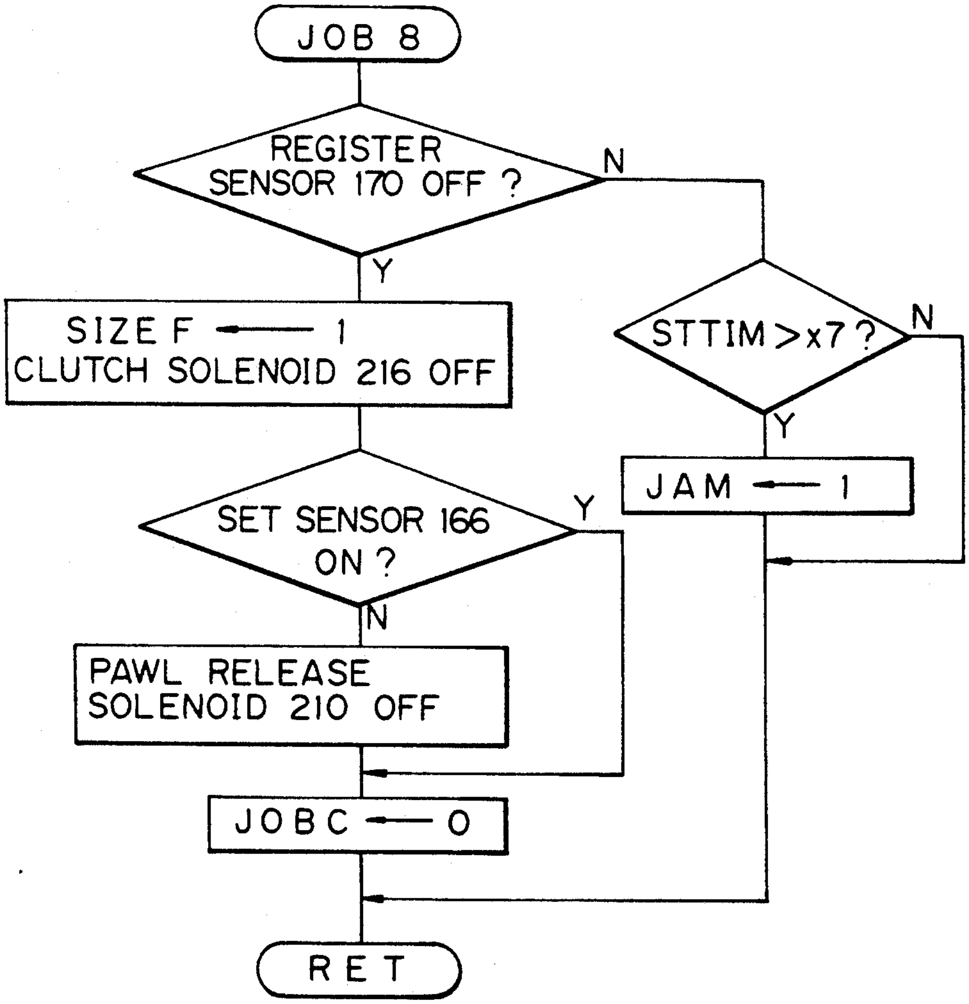

In "job 5" processing shown in FIG. 31F, 5TPC is representative of a counter for counting output pulses of the encoder E5 which is associated with the motor M5. The counter 5TPC is used to control the first stop of the CF paper 10, not to speak of the stops of ordinary documents. SIZSNF is representative of a size sensor flag which is used in another subroutine (not shown) for document size detection. When a size sensor is ON, the size sensor flag is a ONE and, if otherwise, it is reset to a ZERO. Specifically, the document size is determined as to the length by counting output pulses of the encoder E5 which appear during the interval between the turn-on and the turn-off of the register sensor 170. This, however, does not suffice for the discrimination between a laterally fed A4 document and a longitudinally fed A5 document because they are the same with respect to the length (number of pulses). In the light of this, a width sensor is provided and is turned on for an A4 lateral document and turned off for an A5 longitudinal document. SIZEF is representative of a flag which becomes a ONE when a document moved away from the register sensor 170, joining in the control over the timing for reading pulse data in the event of document size check. While the flag SIZEF is in a ONE, pulse data are read according to another subroutine.

Figure 32:
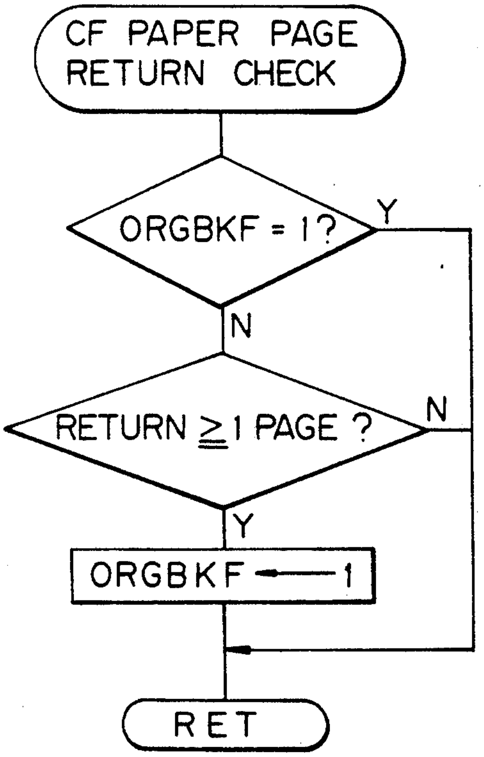
Figure 33:
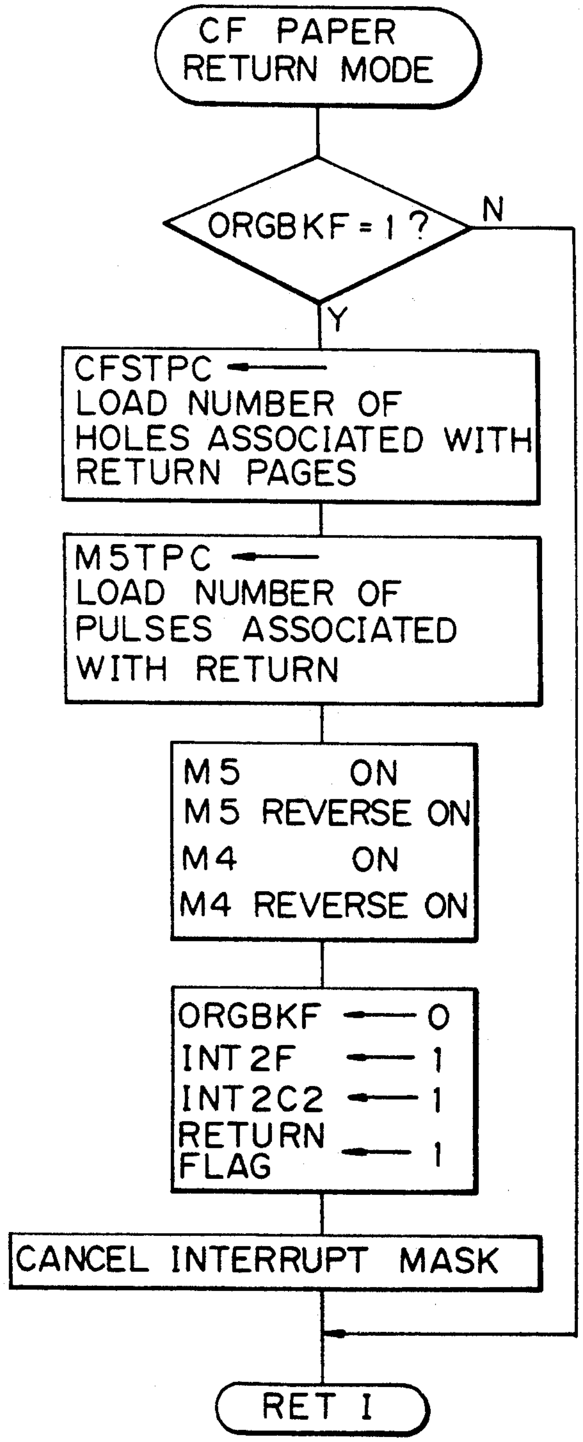

FIG. 32 shows a "CF paper page return check" subroutine which is one of characteristic features of the illustrative embodiment. This routine is adapted to determine whether or not the copier 30 has sent a number of pages to be returned. First, when a flag ORGBK is a ONE (set to a ONE on generation of a return by the copier 30), this checking subroutine is not executed until one return processing completes. Depending on whether or not the number of pages to be returned is more than 1, the program checks the number of pages to be returned which is fed from the copier 30. Here, a document return mode is set up if more than one pages should be returned. In the CF paper return mode, a subroutine shown in FIG. 33 is executed. In the subroutine of FIG. 29, the number of pages to be returned sent from the copier 30 is checked, the counters CFSTPC and M5STPC are respectively loaded with the number of sprocket holes 24 and the number of motor M5 drive pulses each being associated with the number of pages to be returned, and the motor M4 is reversed together with the motor M5 to feed the CF paper 10 in the reverse direction. While this processing is under way, a motor 5 stop control flag INT5F is set to a ONE to execute a "motor M5 stop control 1" subroutine shown in FIG. 34.

Figure 34:
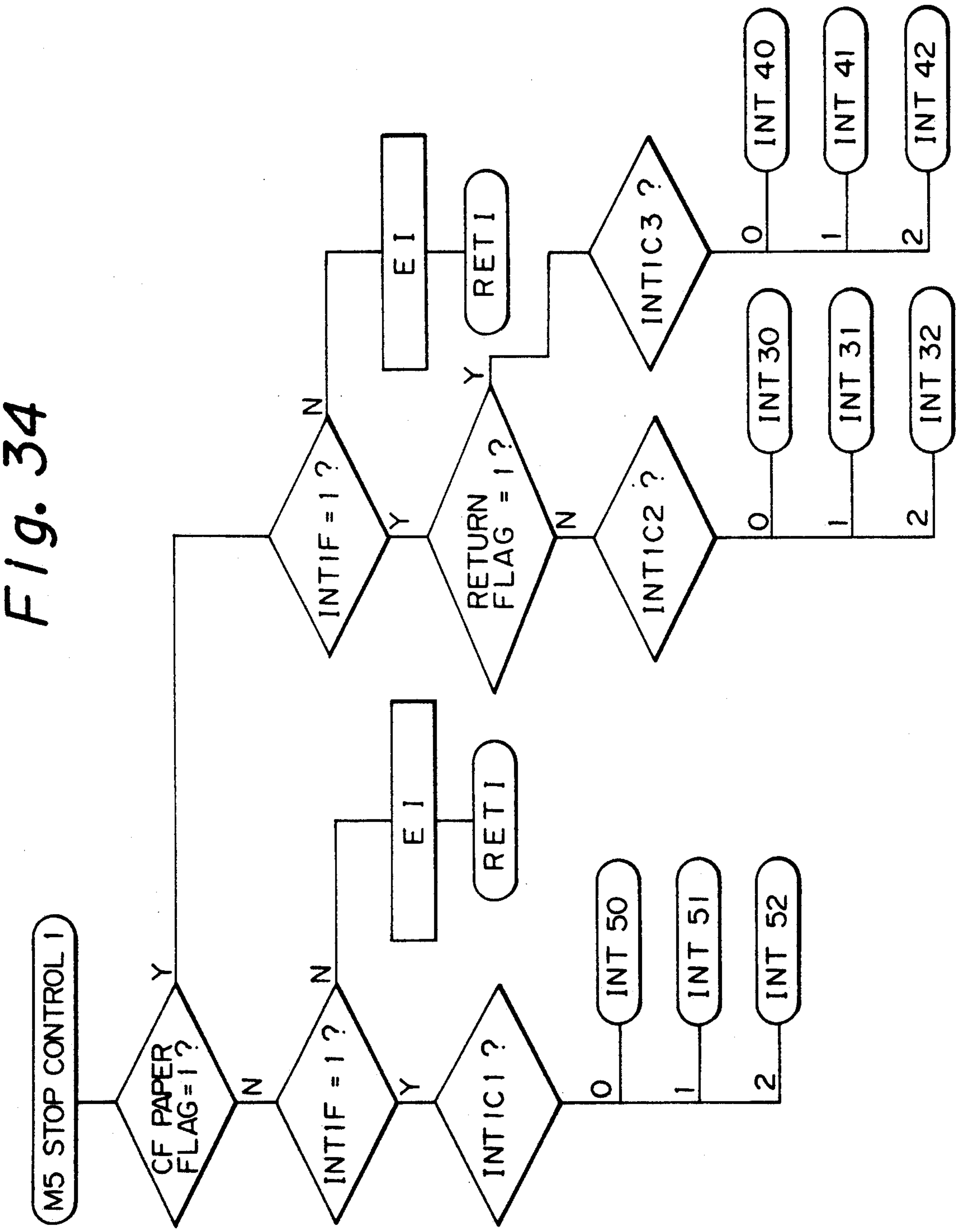

The "motor M5 stop control 1" procedure is an external interrupt routine associated with the CPU 200 which commonly practiced in the art. Specifically, every time an output pulse of the encoder E5 associated with the motor M5 arrives at the interrupt terminal INT1 shown in FIG. 26, processing shown in FIG. 34 is executed, i.e., the above-mentioned procedure is executed when a pulse arrives while an INT1 interruption is accepted. This processing is performed even when the document is an ordinary document as distinguished from the CF paper 10. In such a case, the processing will proceed on the basis of the count of an interrupt job counter INT1C1. The interrupt job counter INT1C1 executes any of different kinds of processing as represented by INT50, INT51 and INT52 which are known in the art, and details thereof will not be described. Specifically, when a document fed from the document table 158 is to be transported to a predetermined position, output pulses of the encoder E5 begin to be counted when the leading edge of the document is sensed by the register sensor 170. As the number of pulses being counted reaches a predetermined value, the motor M5 is deenergized to stop the document at the reference position $P_o$.

In the case of the CF paper 10, when a flag IN1F is a ONE, different kinds of processing occur depending on whether the return flag is a ONE or not. One of the different kinds of processing is to transport the CF paper 10 represented by the job counter IN1C2 to a predetermined position. This is represented by INT30 to INT32 in FIG. 35A. First, by the processing INT31, M5TPC is incremented by 1 (one) for counting output pulseses of the encoder E5, and whether or not the counter M5 has reached a predetermined amount of transport Y3 is determined. If it has reached such an amount, the processing INT32 is executed to stop the motor M5. As a result, the CF paper 10 is transported in the forward direction to the reference position $P_o$ and then stopped there. More specifically, after interrupt routines INT10 and INT11 shown in FIG. 37A have been completed, above-stated subroutine is executed to determine the remaining distance to the reference position $P_o$ in terms of the number of output pulses of the encoder E5 and, as a predetermined number of pulses is reached, the motor M5 is stopped to set the leading edge of the CF paper 10 at the reference position $P_o$ (condition shown in FIG. 23B).

Figure 35A:
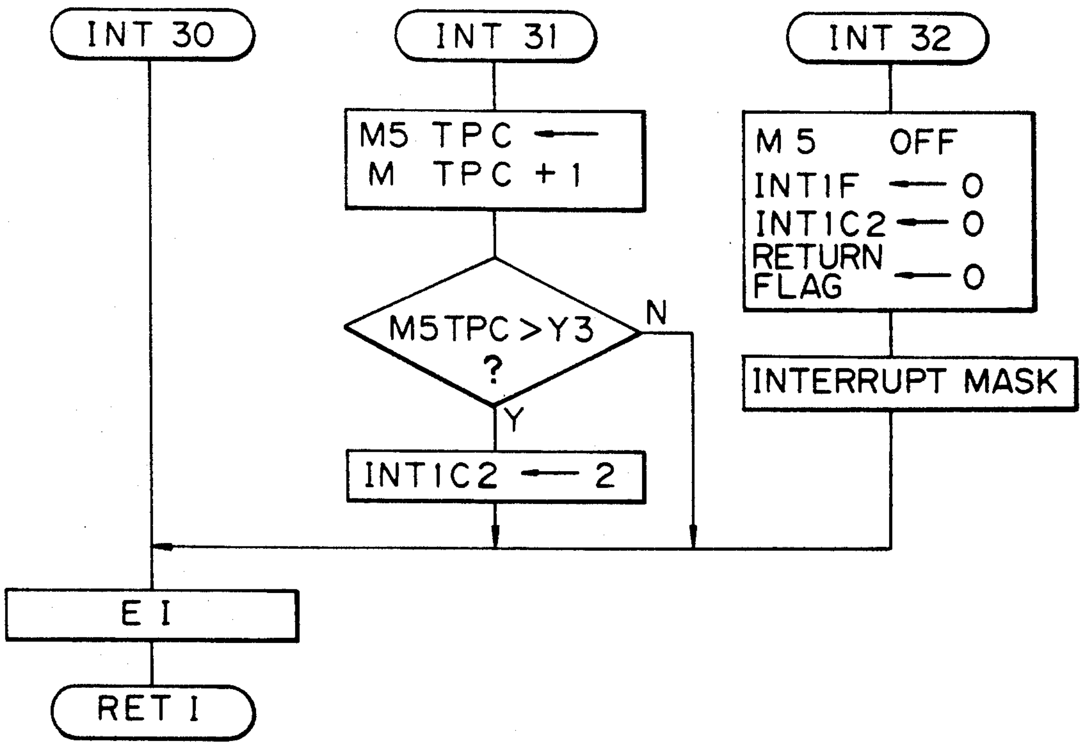
Figure 35B:
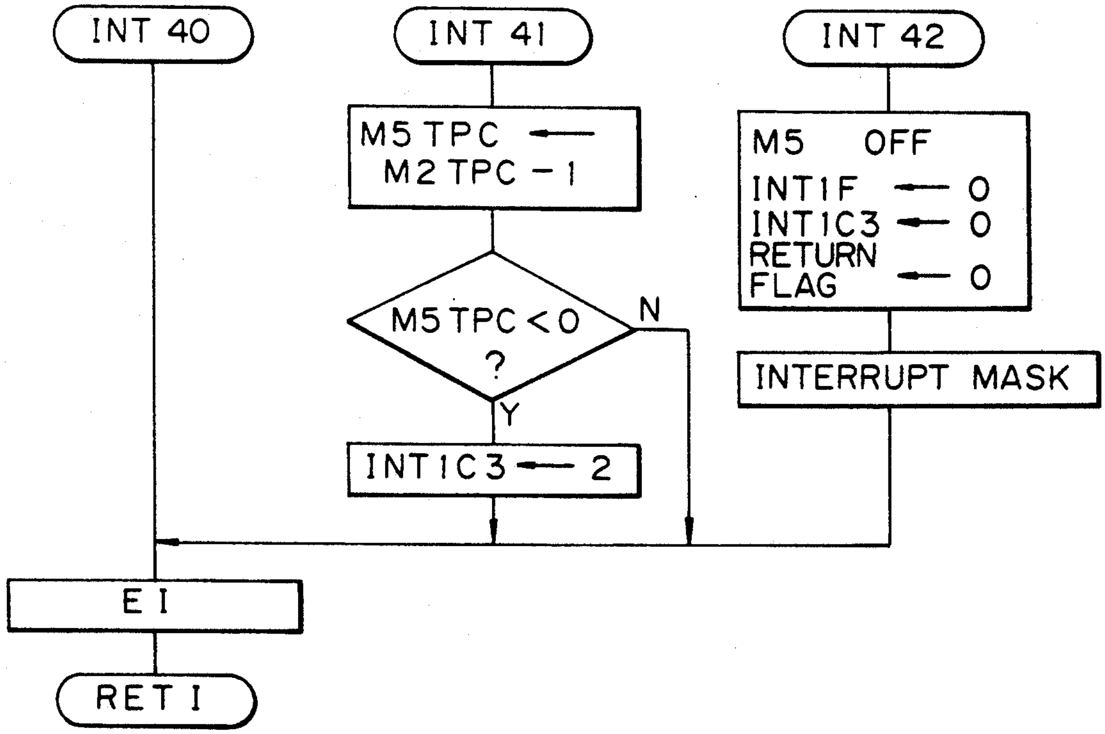

The other processing of interest is the return the CF paper 10 which is implemented by the interrupt job counter INT1C3, i.e., interrupt routine INT40 to INT42 (FIG. 35B). First, the counter M5 is decremented by 1 (one) by the INT41 processing. The processing INT41 is executed every time an output pulse of the encoder E5 arrives at the terminal INT1 of the CPU 200. The initial value of the counter M5TPC is determined beforehand by the processing which has been described with reference to FIG. 33. Then, whether or not the counter M5TPC has reached "0" is determined and, if it has reached "0", the processing INT42 is executed for deenergizing thr motor M4 together with the motor M5. By this procedure, the CF paper 10 is returned by the predetermined amount toward the document feed side. More specifically, after the processing INT20 and INT21 shown in FIG. 37B, the leading edge of the CF paper 10 is returned by the predetermined number of pages until it assumes the reference posiion $P_o$.

Figure 36:
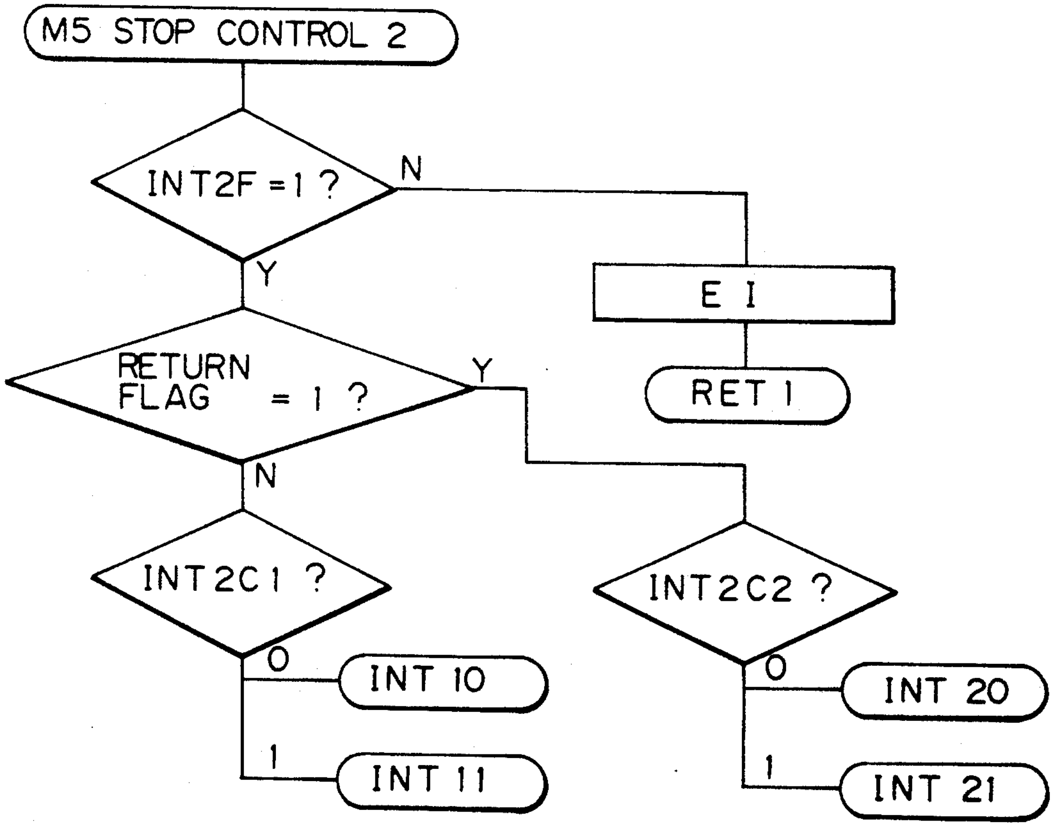

FIG. 36 shows a "motor M5 stop control 2" subroutine which is one of common interrupt flowcharts associated with the CPU 200. This subroutine is executed every time the sensor 232 senses a sprocket hole 24 of the CF paper 10, the output of sensor 232 being applied to the terminal INT2 of the CPU 200 (FIG. 26).

First, when an interrupt flag INT2 is a ONE, a different kinds of processing are executed depending on whether or not the return flag is a ONE. When the return flag is not a ONE, the control for transporting the CF paper 10 to the predetermined position on the basis of the count of an interrupt job counter INT2C1 is performed, i.e., the sprocket holes 24 of the CP paper 10 are counted. For the first page 14a of the CF paper 10, the sprocket holes 24 sensed by the sensor 232 begin to be counted when the register sensor 170 senses the leading edge of the CF paper 10 while, for the second page 14*b* and successive pages, they begin to be counted with the first page 14*a* serving as a reference. Specifically, as represented by processing INT10 an INT11 in FIG. 37A, a counter CFSTPC assigned to CF paper is incremented by 1 so as to count the sprocket holes 24 of the CF paper 10. When the CF paper 10 is fed, whether it is the first page or not is determined. If it is the first page, whether or not a predetermined amount of feed assigned to the first page has been reached is determined in terms of the count of the counter CFSTPC, i.e., whether or not the counter has reached a predetermined value Y1. If such a particular amount of feed has been reached, the interrupt processing is ended. If the CF paper 10 is any of the second and successive pages, whether or not a predetermined amount of feed assigned to the second and successive pages has been reached is determined by referencing whether or not the counter CFSTPC has reached a predetermined vaue Y2. If such an amount of feed has been reached, the interrupt processing is ended. In any case, as soon as the counter CFSTPC reachs a predetermined value, the "M5 stop control 1" routine (INT30 to INT32) shown in FIG. 34 is executed for counting output pulses of the encoder E5, stopping the motor M5 when a predetermined number of pulses are counted, and thereby setting a desired page of the CP10 in the predetermined position.

Figure 37A:
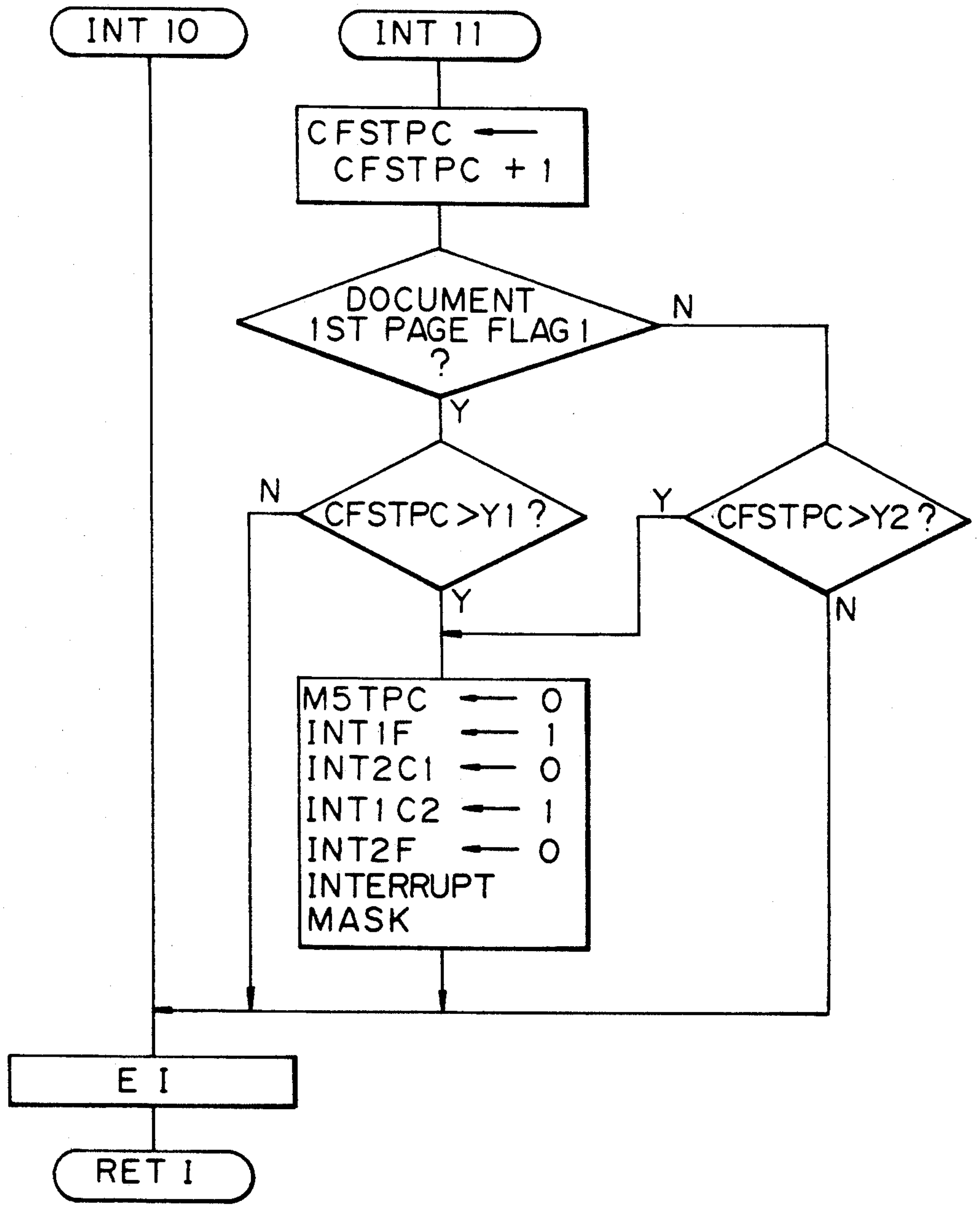
Figure 37B:
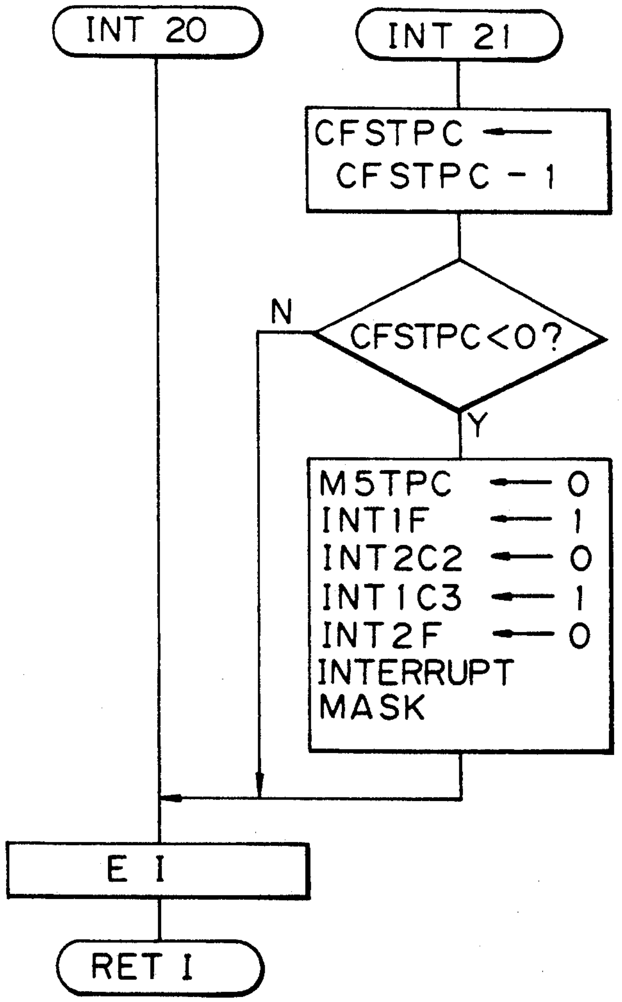

On the other hand, when the return flag is ONE, a control for CF return processing is executed by using a "interrupt job counter INT2C2" subroutine (specifically, INT20 and INT21 shown in FIG. 37B). When a paper sheet jams the copier 30, the copier 30 sends a signal indicative of a number of pages by which the CF paper 10 should be returned, so that a particular page of the CF paper 10 which is associated with the jamming sheet may be copied again. When the CF paper 10 is to be returned by the reverse rotation of the motor M5, the CF paper 10 is returned toward the document feed side of the ADF 150 by counting the number of sprocket holes 24 representative of the specified number of pages and, as soon as such a number of sprocket holes 24 are counted, the "M5 stop control 1" routine shown in FIG. 34 (INT40 to INT42) is executed.

In summary, it will be seen that the present invention provides an ADF for an image recorder which is capable of not only copying a desired page of CF paper but also effecting jam recovery in the event when a paper sheet jams the image recorder.

Various modifications will become possible for those skilled in the art after receiving the teachings of the present disclosure without departing from the scope thereof.

What is claimed is:

1. An automatic document feeder (ADF) for an image recorder having a top open platen, comprising:

sheet-like document feeding means for feeding sheet-like documents to the platen, each of the sheet-like documents having a predetermined size;

a separate inlet for feeding therethrough to the platen a continuous document constituted by a sequence of continuous pages and having a plurality of equally spaced feed holes;

document transporting means located to face the platen for transporting any of the documents placed on and along the platen;

document discharging means for discharging said document from the platen;

holes sensor means located upstream of the platen with respect to an intended direction of transport of the continuous document for generating feed pulses by sensing the feed holes of the continuous document;

counter means coupled to said holes sensor means and receiving therefrom said generated feed pulses, for counting the number of said generated feed pulses; and control means coupled to said counter means for controlling said automatic document feeder such that, when said counter means counts a predetermined number of feed pulses, which when said number counted differs from the condition wherein a continuous document is beginning to be transported and a second number wherein a continuous document is in transport, the continuous document is determined to have jammed.

2. An ADF as claimed in claim 1, wherein said predetermined number is greater in the condition wherein the continuous document begins to be transported than in the condition wherein the continuous document is in transport.

3. An ADF as claimed in claim 1, wherein a determination of a jam occurs when the counted feed pulses differ from a predetermined number indicative of a condition wherein the continuous document is transported by said document transporting means with respect to the number of feed pulses indicative of a condition wherein the continuous document is transported by said document discharging means.

4. An ADF as claimed in claim 3, wherein said predetermined number is greater in the condition wherein the continuous document is transported by said document transporting means than in the condition wherein the continuous document is transported by said document discharging means.

* * * * *

UNITED STATES PATENT AND TRADEMARK OFFICE
CERTIFICATE OF CORRECTION

PATENT NO. : 5,158,221

DATED : October 27, 1992

INVENTOR(S) : Kenji Hashimoto et al.

It is certified that error appears in the above-identified patent and that said Letters Patent is hereby corrected as shown below:

On the title page, Item [63],

The Related U.S. Application Data has been omitted, should be,

--This Application is a Continuation-in-part of Ser. No. 356,452, May 24, 1989, abandoned.--

Signed and Sealed this

Twelfth Day of October, 1993

*Attest:*

BRUCE LEHMAN

*Attesting Officer*

*Commissioner of Patents and Trademarks*